US009414105B2

(12) United States Patent
Rajapakse

(10) Patent No.: US 9,414,105 B2
(45) Date of Patent: Aug. 9, 2016

(54) MOBILE SOURCE DEVICE MEDIA PLAYBACK OVER RENDERING DEVICES AT LIFESTYLE-DETERMINED LOCATIONS

(75) Inventor: Ravi Rajapakse, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 0 days.

(21) Appl. No.: 13/372,516

(22) Filed: Feb. 14, 2012

(65) Prior Publication Data

US 2012/0284757 A1 Nov. 8, 2012

Related U.S. Application Data

(60) Provisional application No. 61/442,574, filed on Feb. 14, 2011.

(51) Int. Cl.
 H04N 21/414 (2011.01)
 H04N 21/433 (2011.01)
 H04N 21/45 (2011.01)
 H04W 4/02 (2009.01)

(52) U.S. Cl.
 CPC ..... *H04N 21/41407* (2013.01); *H04N 21/4331* (2013.01); *H04N 21/4524* (2013.01); *H04W 4/023* (2013.01)

(58) Field of Classification Search
 CPC .................................................. H04N 21/432
 See application file for complete search history.

(56) References Cited

U.S. PATENT DOCUMENTS

| 3,026,373 | A | * | 3/1962 | Fine | H03F 3/68 330/103 |
|---|---|---|---|---|---|
| 5,509,027 | A | * | 4/1996 | Vook et al. | 375/134 |
| 6,112,323 | A | * | 8/2000 | Meizlik et al. | 714/748 |
| 2002/0018458 | A1 | * | 2/2002 | Aiello | H04W 56/0015 370/348 |
| 2002/0062366 | A1 | * | 5/2002 | Roy et al. | 709/224 |
| 2004/0260800 | A1 | * | 12/2004 | Gu et al. | 709/223 |
| 2006/0013262 | A1 | * | 1/2006 | Downey et al. | 370/503 |
| 2007/0110074 | A1 | * | 5/2007 | Bradley et al. | 370/395.51 |
| 2009/0052380 | A1 | * | 2/2009 | Espelien | 370/328 |
| 2010/0161822 | A1 | * | 6/2010 | Palm et al. | 709/231 |
| 2010/0315972 | A1 | * | 12/2010 | Plotnik et al. | 370/254 |

OTHER PUBLICATIONS

Boronat, et al. "Multimedia group and inter-stream synchronization techniques: A comparative study." Information Systems, vol. 34, Issue 34, (Mar. 2009). pp. 108-131.*

* cited by examiner

*Primary Examiner* — Nathan Flynn
*Assistant Examiner* — William J Kim
(74) *Attorney, Agent, or Firm* — Galvin Patent Law LLC; Brian R. Galvin

(57) ABSTRACT

A system for transmission and rendering of media data over an Internet Protocol network from portable data storage source devices to spatially-separated destination devices located at lifestyle-determined locations. Destination devices are brought online by a discovery process as they come in the vicinity of a source device. In the interest of speed, discovery messages utilize low-overhead, asynchronous messaging. The discovery process begins with multicasting from a source device to local destination devices of discovery messages which include a unique session key and zone, priority and ID specifications, followed by unicasting of a discovery acknowledgement message from destination devices to the source device, and unicasting of a configuration message from the source device to destination devices. In one preferred embodiment, the latest source device to come into the vicinity of a destination device becomes the source of the media rendered by the destination device.

9 Claims, 18 Drawing Sheets

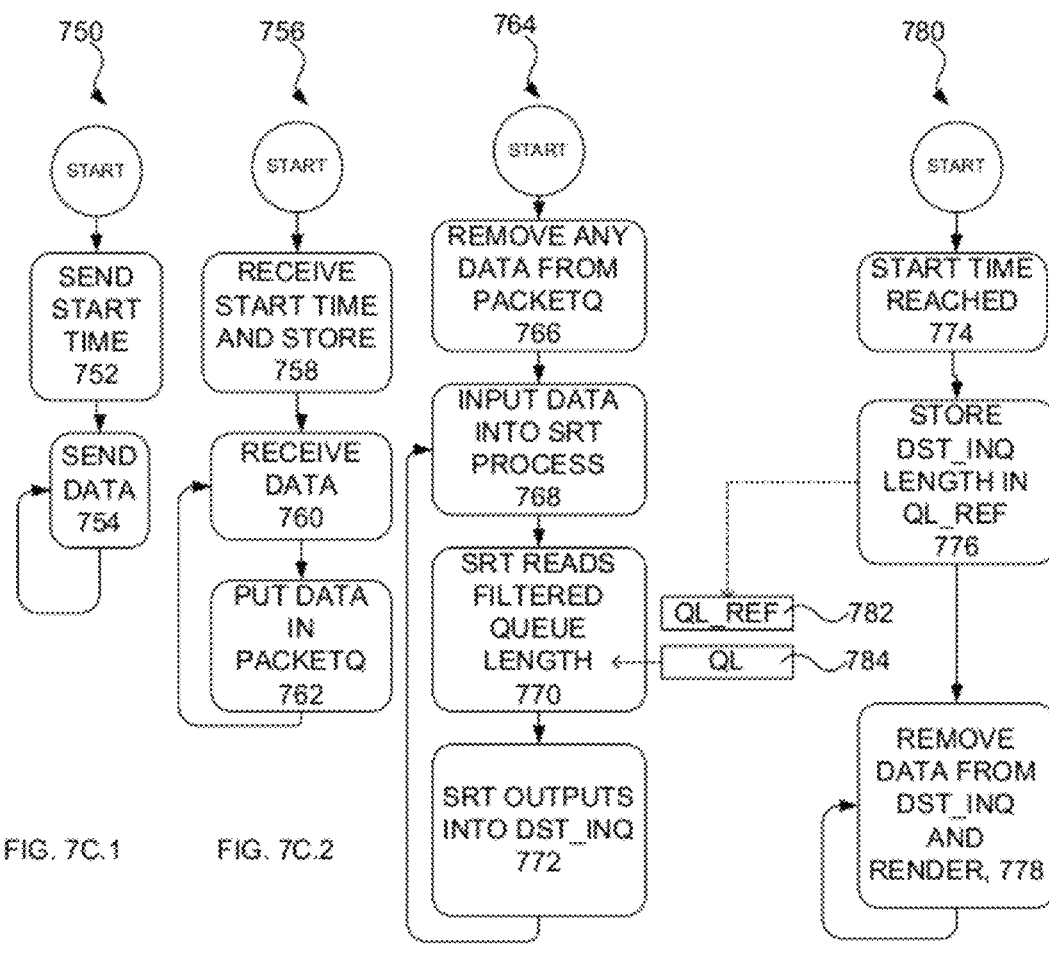

MOBILE SOURCE DEVICE MEDIA PLAYBACK OVER RENDERING DEVICES AT LIFESTYLE-DETERMINED LOCATIONS

CROSS REFERENCE TO RELATED APPLICATIONS

This application claims priority under 35 U.S.C. §119(e) to U.S. Provisional Patent Application Ser. No. 61/442,574, filed Feb. 14, 2011, entitled "Techniques for Real Time Multi Destination Media Distribution, Control and Setup" the entire content of which is incorporated herein by reference.

BACKGROUND OF THE INVENTION

Field of the Invention

The present invention is directed to network communications and to digital media transmission and rendering. The present invention is also directed to lifestyle-adapted media consumption and particularly to systems enabling users' shared experiencing of media in real-world environments.

SUMMARY OF THE INVENTION

The present invention is directed to a system for playback of media via a communication network from a mobile source device to spatially-separated destination devices at lifestyle-determined locations. The mobile source device has media storage, means for multicasting and unicasting over the communication network, and a destination transition mechanism. The destination transition mechanism utilizes a discovery process to detect the proximity of destination devices and configuring them for receiving and rendering media transfer from the mobile source device to a proximate destination device. Movement of the mobile source device from near a first destination device to near a second destination device results in the media rendering transitioning from the first destination device to the second destination device.

The present invention is also directed to a method for media transmission and rendering between a source device and a destination device. The source device multicasts, asynchronously relative to said destination device, to a global address over a data transmission network a first plurality of consecutive discovery messages. The destination device receives at least one of the discovery messages and unicasts, asynchronously relative to said source device, a second plurality of consecutive discovery acknowledgement messages to the source device, where the first plurality being greater than the second plurality. The source device receives at least one of the discovery acknowledgement messages from the destination device and unicasts, asynchronously relative to the destination device, a third plurality of consecutive discovery configuration messages with information enabling media transfer from the source device to the destination device, where the first plurality is also greater than the third plurality. The source device then sends (unicasts or multicasts) media data to said destination device where it is rendered.

The present invention is also directed to a method for media transmission and rendering between two source devices and a destination device. A first source device multicasts, asynchronously relative to the destination device, to a global address over a data transmission network a first number of consecutive discovery messages, each of the discovery messages containing a unique session key incorporating a clock value at the source device and a unique device identifier of the source device. The destination device receives at least one of the discovery messages, sets a current session key to the unique session key, and unicasts asynchronously relative to said first source device a second number of consecutive discovery acknowledgement messages containing the current session key, the first number being greater than the second number. A second source device multicasts asynchronously relative to the destination device to the global address the first number of consecutive discovery messages, each of the discovery messages containing a second unique session key incorporating the clock value at the second source device and a unique device identifier of second source device. The destination device receives at least one of the discovery messages from the second source device, re-sets the current session key to the second unique session key, and unicasts asynchronously relative to the second source device the second number of consecutive second discovery acknowledgement messages containing the current session key to the second source device. The second source device receives at least one of the second discovery acknowledgement messages from the destination device and unicasts, asynchronously relative to the destination device, a third number of consecutive discovery configuration messages containing the (re-set) current session key and having information enabling media transfer from the second source device to the destination device. Then, the second source device transfers media data to the destination device and the destination device renders the media data utilizing information in the discovery configuration messages.

The present invention is also directed to a system for media transmission and rendering over a data network from a portable source device having media storage and means for transmission of media on the data network to two destination devices each having a local clock, means for reception of media on the data network, and means for rendering of the media. Additionally, there is a synchronization channel between the two destination devices for media rendering synchronization. A first destination device sends a periodic beacon message over the synchronization channel. Each of the periods of the periodic beacon message has a plurality of slots. Within a first of the slots of the periodic beacon message from the first destination device is a clock value from the local clock of the first destination device corresponding to a beginning time of each of the periods. The second destination device receives the periodic beacon message and utilizes the first clock value for synchronization of its local clock with the local clock of the first destination device.

The present invention is also directed to a system for media playback via a communication network. The media source device has media storage, a local clock and means for communication on the communication network and produces media at a rate based on its local clock. The destination device on this communication network has a local clock, a media converter for converting media from media at one rate to media at another rate, which received media from the media source device and a media data buffer that receives media from the media converter. The destination device removes media from the media buffer and renders it at a rate determined by its local clock. The destination device monitors the amount of data in the media data buffer against a reference amount and adjusts the media converter to raise or lower its media conversion rate, based on the deviations of the amount of data in the media data buffer from the reference amount It is therefore an object of the present invention to provide a system for media playback with the media being provided by mobile source devices and rendering/playback being performed by mobile or non-mobile destination devices.

It is another object of the present invention to provide a system for media playback from mobile source devices to real-world shared-audio environments.

Furthermore, it is an object of the present invention to provide a system for media playback from mobile source devices to spatially-separated destination devices where destination devices are dynamically selected for rendering of the media based on presence, proximity and/or spatial zones and/or priority level and/or other identification information.

It is another object of the present invention to provide a system for management of transitions of media playback between multiple source devices and multiple destination devices, particularly using a low-overhead, high-speed protocol.

It is another object of the present invention to provide a system for management of transitions of media playback between multiple source devices and multiple destination devices using asynchronous transmissions.

Furthermore, it is another object of the present invention to provide a system for transitions of media playback between multiple source devices and multiple destination devices using a combination of multicasting and unicasting.

BRIEF DESCRIPTION OF THE DRAWINGS

FIG. 7C.1 through 7C.4 illustrates process steps performed to implement the source rate tracking methods in accordance with one embodiment.

DETAILED DESCRIPTION OF THE INVENTION

Today mobile devices (mobile phones, tablets, readers, notebooks etc) have powerful media (audio and video) capabilities, are connected to the internet via cell phone data services or broadband links that are high bandwidth and can access online media services that have wide and deep content. This has resulted in these devices being extremely popular as media entertainment devices. However, the playback of this media has been limited to using ear buds or speakers on the mobile devices for audio and the small screen for video, which limits the user experience that can be obtained with these devices. Therefore, there is an increasing need to play the media to external devices in order to get a larger, better experience of the media. A common example of this is an iPhone (iPhone is a product and Trademark of Apple Computers Inc.) dock that is used to connect the iPhone so its music can be heard through larger speakers that are louder. There is a similar need to experience the video on a larger display.

Current approaches to getting the media out of the phone have been to use wires or docks. These approaches substantially limit the mobility of these devices and thereby diminish their value.

Since these mobile devices are typically Wi-Fi enabled (Wi-Fi is a trademark of the Wi-Fi Alliance and a brand name for products using the IEEE 802.11 family of standards), there is a compelling case to transfer the media from these devices using Wi-Fi. This would enable these devices to transfer the media wirelessly without docking or limiting its flexibility. When such applications are considered, one can envision a typical Wi-Fi enabled household with a number of mobile devices and a number of media playback systems located at various points in the household and the desire for these mobile devices to play to one or more of the media playback systems simultaneously.

The general case of this application is that of multiple IP (Internet Protocol, as defined by the Internet Engineering Task Force [IETF] standards body) networked media source devices choosing, connecting and playing media to multiple IP networked media playback devices over an IP network. A Wi-Fi network is a type of IP network.

The present invention is directed at such applications where there is a need for real time, dynamic, multi-source, multi-destination media transfer over an IP network where the media sources and destinations are network enabled to send and receive media.

Figure 1A:
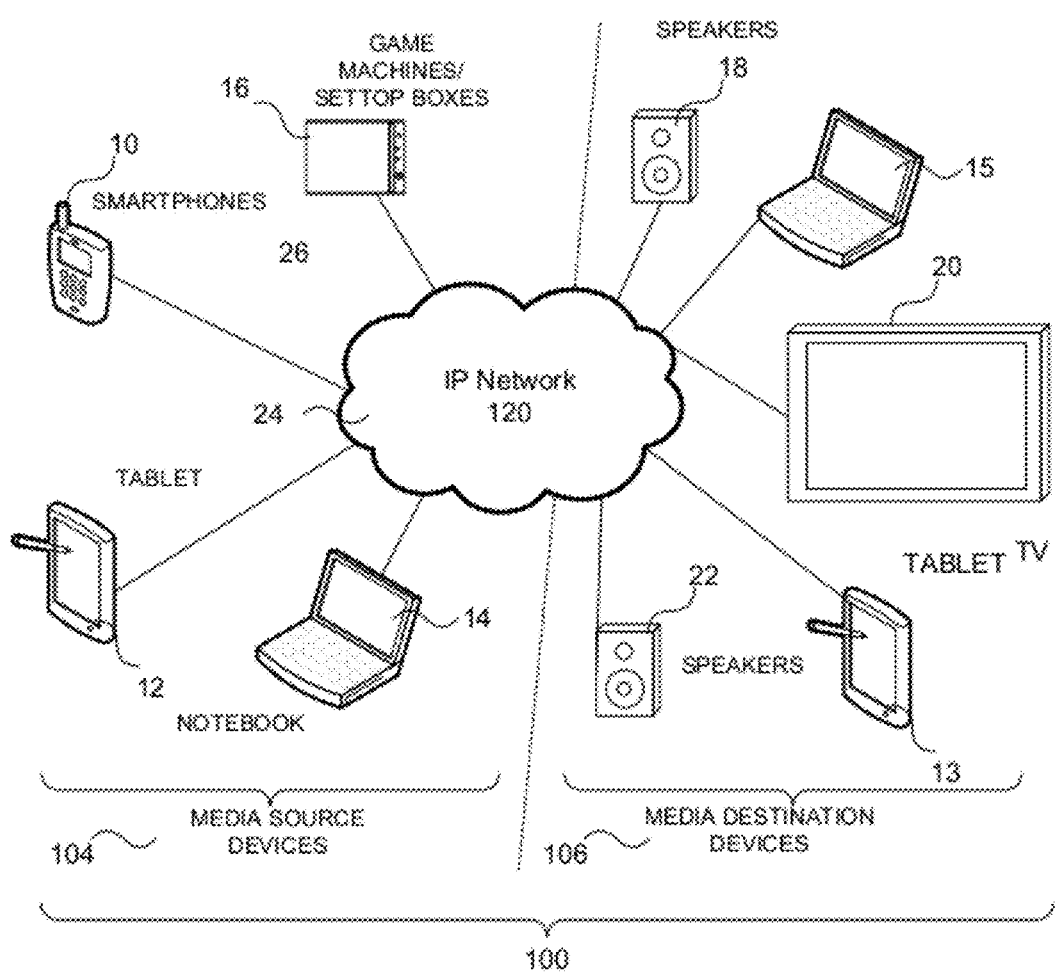
FIG. 1A illustrates an overview of the devices in a system in accordance with one embodiment.

Furthermore, the present invention is directed to situations where there is a need to create a media session with a plurality of media destinations 106, See FIG. 1A, simultaneously and where the number of destinations 106 participating in the session may increase as new destinations 106 become available, or may decrease if destination participants 106 drop out of the session. This can occur for example if the media source 104 is a mobile device and it comes within communication range of additional destination devices 106 or goes out of communication range of destination devices 106.

For such situations, speed of data transfer and network efficiency 120 is important and operational delays need to be kept to a minimum.

FIG. 1A shows an exemplary system 100 having multiple media source devices 104 and multiple media destination devices 106.

Figure 1B:
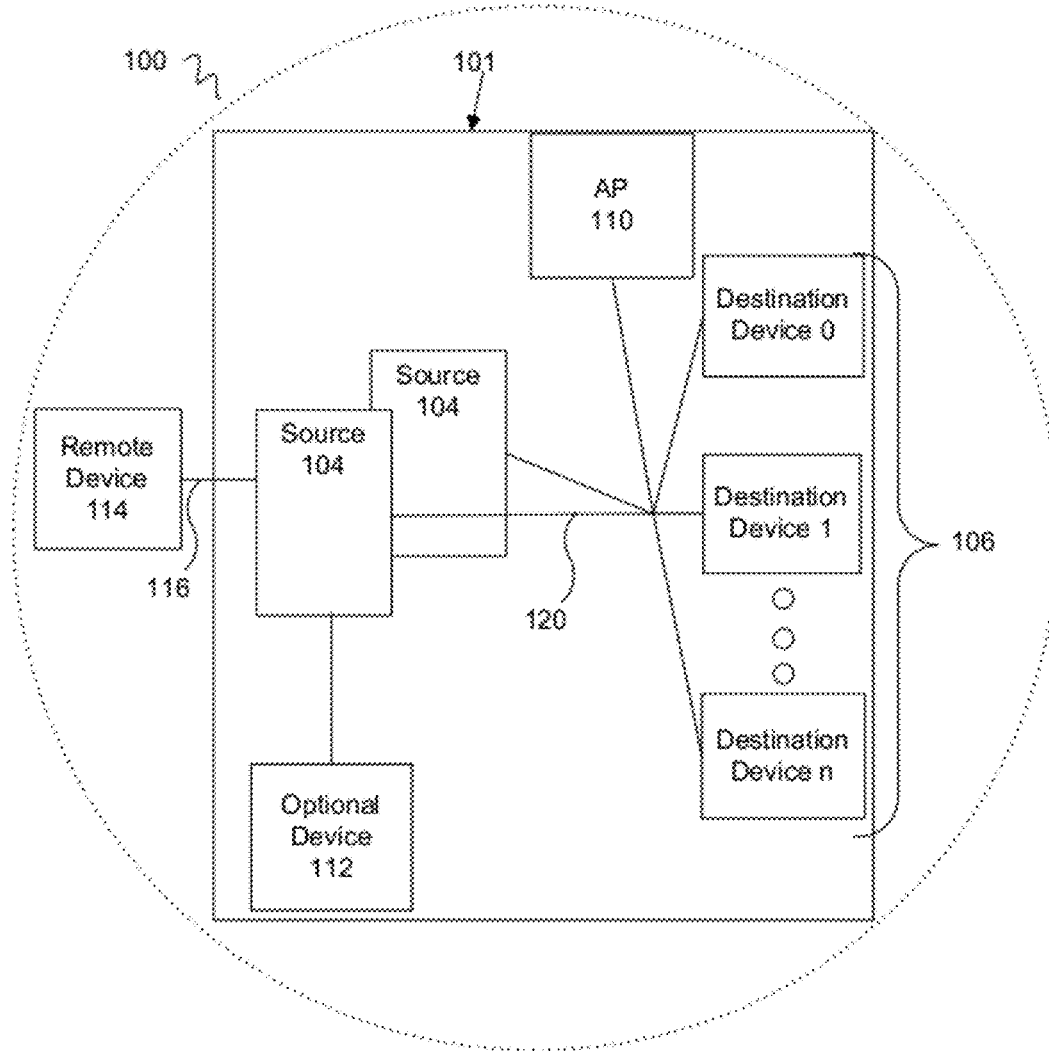
FIG. 1B illustrates a schematic of the devices in a system in accordance with one embodiment.

FIG. 1B is a schematic diagram of such a media system 100. It 100 is made up of one or more IP network-enabled media source devices 104 and one or more IP network enabled media destination devices 106 connected via an IP network 120.

A media source device 104 can be any variety of computing devices that can originate digital media including computers (e.g. desktop, notebook, tablet, handheld), mobile devices (e.g. smart phone, electronic book reader, organizer devices), as well as set-top boxes and game machines. The media is any form of digital media, including audio or video, images, data, and/or meta data.

Media destination devices 106 are devices that can receive digital media over an IP network 120 and play this media. This includes IP-enabled audio and/or video devices that can render audio or video or both at the same time. Media destination devices 106 include computers (e.g. desktop, notebook, tablet, handheld) and mobile devices (e.g. smartphones 13, tablets, notebooks 15). If the media is audio, playing the media means rendering the audio such that a user can listen to the audio. If the media is video, playing means rendering the video such that a user can view the media. If the media includes both audio and video, it means rendering both the audio and the video.

In the media environment of the present invention 100, each media source 104 can send its media to a selected set of media destination devices 106 for playback. In addition to sending media from media sources 104 to destinations 106, the system 100 includes a mechanism for sending one or more control messages from source 104 to one or more destinations 106 and from one or more destinations 106 to a source 104. An example of a source-to-destination messages is an increase/decrease volume message. A source-to-destination message can be sent as a broadcast/multicast message to all destinations 106 or as a unicast message to a specific destination device 106. An example of a destination-to-source message is a skip-forward-to-next-song message sent from one or more destinations 106 to a media source 104. Again this may be a broadcast/multicast message or unicast message to a specific media source.

Control messages, such as those to skip songs or change volume may also be sent by one or more optional devices 112 on the network 120. Optional devices 112 may broadcast/multicast messages or communicate with specific devices via unicast messages. An example of such an optional device 112 is in an automobile application where an optional button on the driver's steering wheel may send a message to increase or decrease volume to all destination devices 106.

Unicast messaging is a type of Internet Protocol transmission in which information is sent from only one sender to only one receiver. In another words, Unicast transmission is a one-to-one node transmission between two nodes only. Broadcast is a type of Internet Protocol transmission in which information is sent from just one computer, but is received by all the computers connected on the network. This would mean that every time a computer or a node transmits a 'Broadcast' packet, all the other computers can receive that information packet. Multicast is a type of Internet Protocol transmission or communication in which there may be more than one sender and the information sent is meant for a set of receivers that have joined a multicast group, the set of receivers possibly being a sub set of all the receivers. When the same data needs to be sent to multiple IP destinations generally Broadcasting or Multicasting, rather than Unicasting, provides the most efficient use of the network.

In this description the terms Broadcast and Multicast may be used. In both Broadcasting and Multicasting when messages are sent, they are received by multiple destinations. Therefore in the present specification the terms Broadcast and Multicast may be used interchangeable to refer to one packet being received by multiple destinations. In some cases this description only says the media is sent or transmitted without specifying whether it is broadcast, multicast or unicast. In this case it means any one of these methods may be used for sending or transmitting the media. In this description, the terms Message and Packet are often used. A Packet is a data set to be sent or received on an Internet Protocol network. A Message refers to the logical information contained in such a packet.

The process of sending the media is initiated by the user of the source device 104 or pre-set to continuously play or by another optional device 112.

The IP network 120 that connects the media sources 104 with the media destinations 106 may be any network that supports an IP protocol. If this 120 is a Wi-Fi network, then the network 120 may include a Wi-Fi access point (AP) or Wi-Fi router 110 that manages the network in infrastructure mode. Alternatively, the network 120 may be using Wi-Fi direct, in which case the AP 110 may not be present.

Media Transfer

To affect media transfer, the media source 104 needs to send the media and the destinations 106 need to receive the media and render it. This may be accomplished in two ways. In a first method, the media source 104 broadcasts (or multicasts) common media to a global destination address. Each destination device 106 listens to this global destination address and receives media from this address if it is sent to this address. Each destination device 106 will play the media according to its local configuration for playing the media. For example, if the destination device 106 is a front left channel speaker in a stereo configuration, it will only play media that contains front left channel audio data. If the destination device 106 is a video player, it will only play the video channel of a media stream.

The destinations 106 participating in playing this media can be further narrowed by having the media source 104 define specific zones and priorities levels for playing the media and configuring the destinations 106 to only participate is specific zones and priority levels.

Alternatively, the media source 104 sends specific media to specific media destination device 106 IP addresses. In this case, the media source 104 needs to first identify the media destinations 106 that will participate in the playback of its media and then stream specific media to specific media destinations 106 for playback. For example, the source 104 can stream the left channel audio data only the left channel speaker 106 and video data only to the video playback device 106.

1. Multi Source, Multi Destination Media Transfer

As shown in FIG. 1A, according to the present invention, it is important for multiple sources 104 to be able to play media to the destination devices 106. There are multiple issues that can occur in such a system 100.

In implementing this, there are time and spatial domain issues and logistics to address.

In the time domain there is a need to manage the order in which the source devices 104 play. This may be controlled with a number of methods. In one method, the last source device 104 to initiate playback causes any ongoing playback of media to stop and playback from this last media source 104 starts. In an alternative method, the latest media playback command will not initiate playback until the current playback of media ceases. In a third method, it is possible for both sources 104 to play and for the media to be 'mixed' during playback. Furthermore, the start of playback can be further controlled with a variety of priority levels.

With regard to the spatial domain, it is possible to have each source 104 send media to completely different sets of destination devices 106, to the same destination devices 106, or have these two sets of destination devices 106 overlap in some combination.

All of these methods are managed by the dynamic real-time discovery and handoff system of the present invention.

Dynamic Real Time Discovery and Handoff

A media source 104 transfers media to one or more media destination devices 106 as part of a media session. The discovery process results in a media transfer session with a select group of destination participants 106. The destination 106 participants for such a media session are discovered dynamically, i.e. when needed, with a real-time discovery process. The purpose of the discovery process is to ascertain the participants in the media transfer. The destination 106 participants are selected on the basis of availability and other criteria such as their media role (left channel audio, or video etc) and what zone they may be applicable to and may be a subset of all those available.

Figure 2A:
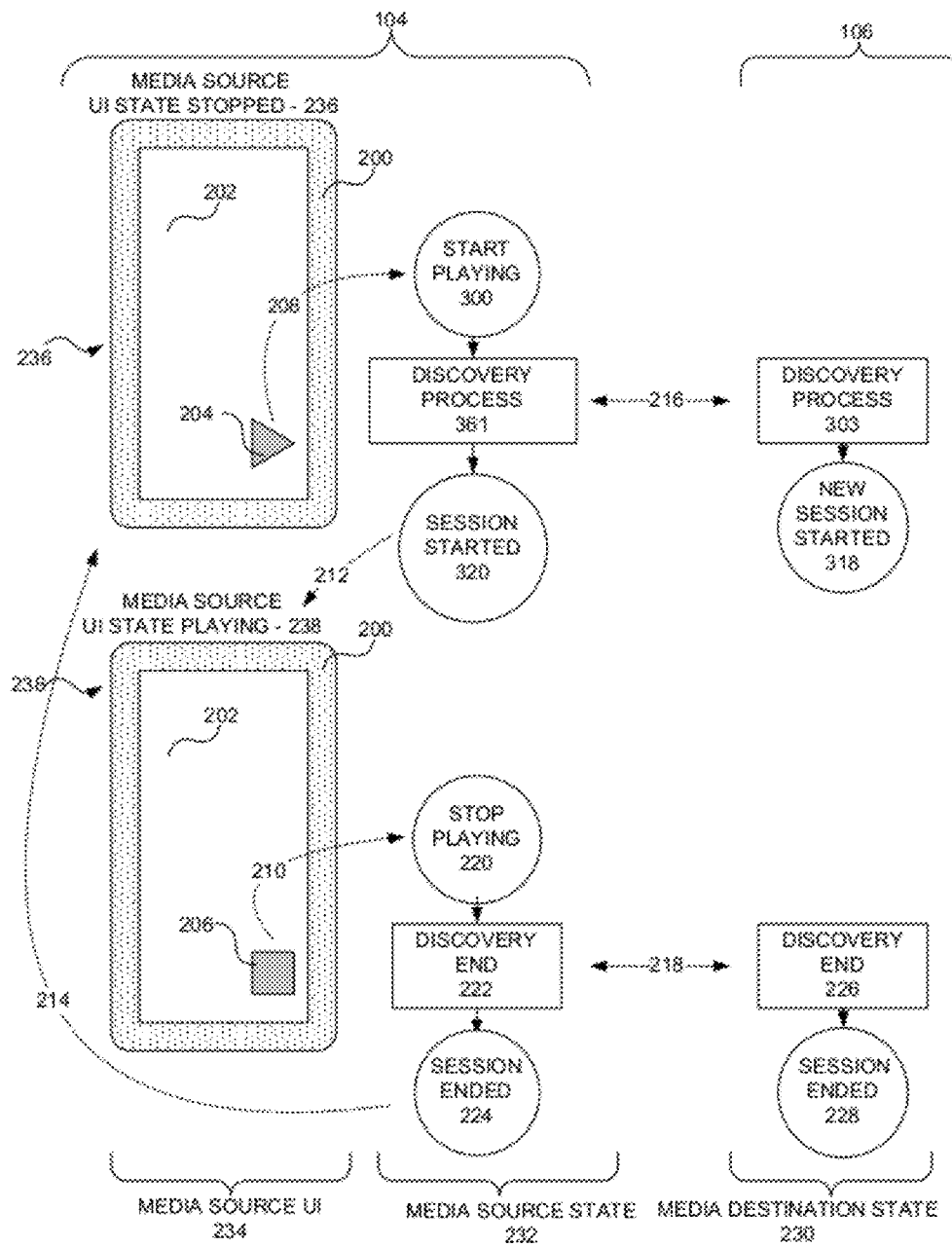
FIG. 2A illustrates the user interface and the high level discovery process context in accordance with one embodiment.

FIG. 2A shows an example of the overall process in this invention. In this case the media source 104 is a mobile tablet device 200 with a touch screen user interface 202. This interface 202 allows the user to select media and press a start media rendering/playback 204 button to initiate playing. When the user presses the playback button 204, the source 104 goes into a start-playing state 300 which then initiates a discovery process 361. As described below, this discovery process 361 will discover one or more destination devices 106 if they exist which will cause a discovery process 303 at the destinations and cause a new session to be started at the source 320 and at the destination 318. These source session 320 and destination session 318 sessions will handle the media transfer between the source 104 and destinations 106. It is important to note that the Discovery process is not part of the session, but that the session is started as a result of the discovery process. During this new session, media will be sent from the source 104 to the destinations 106 and this media will be rendered at the destination devices 106. After the start of the new session 320 at the source 104 the source user interface (UI) 202 will change to a media source UI state playing 238 state and show a stop media playback button 206.

If the user presses the stop media playback button 206, this will cause the source 104 to go into a stop playing state 220, which will cause a source discovery end process 222 to initiate. This process 222 will notify the destinations 106 of the end of the session by initiating a discovery end 226 process at each destination device 106. The discovery end processes 222, 226 will cause the session to end at the source and destination 224, 228, respectively. At the end of the session at the source 224, the media source user interface will change back to a media source UI stopped 236 state.

A media source session begins after a media source 104 discovers 361 destinations 104 and starts a session 320 and extends until either (i) this media source 104 ends the session by initiating stop playing 220 and the discovery end process 222 or (ii) by a second media source 104 starting a session with all the destinations 106 that the initial media source 104 had in its session. A destination media session starts during the discovery process as described below and ends either with a discovery end process 226 or by this destination device 106 being discovered 303 by another source 104.

In an alternative embodiment of the present invention, the discovery process 361 may be initiated and a new session started via a prior user interface display 202 (not shown) and with a play button that can initiate rendering of media for this session that was already started.

For improving speed of transfer, many applications use UDP (User Datagram Protocol, as defined by the Internet Engineering Task Force (IETF) RFC 768) rather than TCP/IP (Transmission Control Protocol/Internet Protocol as defined by the Internet Engineering Task Force (IETF) RFC 793) or other protocols. UDP is an internet protocol that transfers UDP data packets from a UDP source to a UDP destination without the overhead of a number of capabilities including ensuring packet order and connection establishment. It is therefore a very fast protocol and appropriate for high-speed media transfer. A disadvantage of using UDP is that packet transfer is not guaranteed, i.e. packets may be lost. Also, the order of the packets in the transfer may not be preserved. Therefore, it is necessary for the system to account for these potential losses.

In the present specification doing things "synchronously" means one activity is completed before the next activity is begun. Key to this step is waiting for the first action to complete. Asynchronous activity means an activity does not have to complete before another is begun. Designing a system for synchronous activity is generally easier as less design consideration has to be given to the consequences of not waiting for an activity to complete before moving on. The disadvantage of a synchronous process is the various wait periods involved.

In the preferred embodiment of the present invention, communications utilize the UDP protocol, with multicasting for most transfers and an asynchronous process.

A key difficulty with UDP operating over a Wi-Fi network is that there is a high likelihood of packet loss. This means any command message sent may not arrive at the destination. A second key difficulty when using UDP for messaging in applications envisioned in this application is that packets transferred may arrive at the destination in the wrong order. For example when a router or access point is forwarding the packets it received, it may not forward it in the same order it received it. This means the order of receipt of packets is not always representative of the order in which it was sent from the source.

To overcome situations when packets may be lost or out of sequence, when using the UDP protocol, packets may be re-ordered by labeling them with a sequence number. However, this is problematic in terms of the present invention since a packet may originate from any one of multiple source devices 104 or any one of multiple destination devices 106. Therefore the sequence number is not enough to identify which message is the result of the most recent operation or activity. For example a first source device 104 may send a packet with a "Start Play" command message in it with sequence number of 93 and second source device 104 may later send the "Start Play" command message in it with sequence number of 77. Similarly an old "End Play" command message packet may be received with a sequence number of 591 from a first source device 104 after a new "Start Play" command message packet with sequence number 300 was received from a second source device 104.

In a typical system it is necessary to communicate between devices, using many types and quantities of command and data sequences. Therefore a common approach is to group activities into "sessions" with a session key. Once the session key is established, all other valid communication packets during that session include the correct current session key. Within the session, a packet sequence number can be used to order packets in the correct sequence and all parties can reset this sequence number at the start of each new session.

A session is started as part of a device discovery process.

Figure 3A:
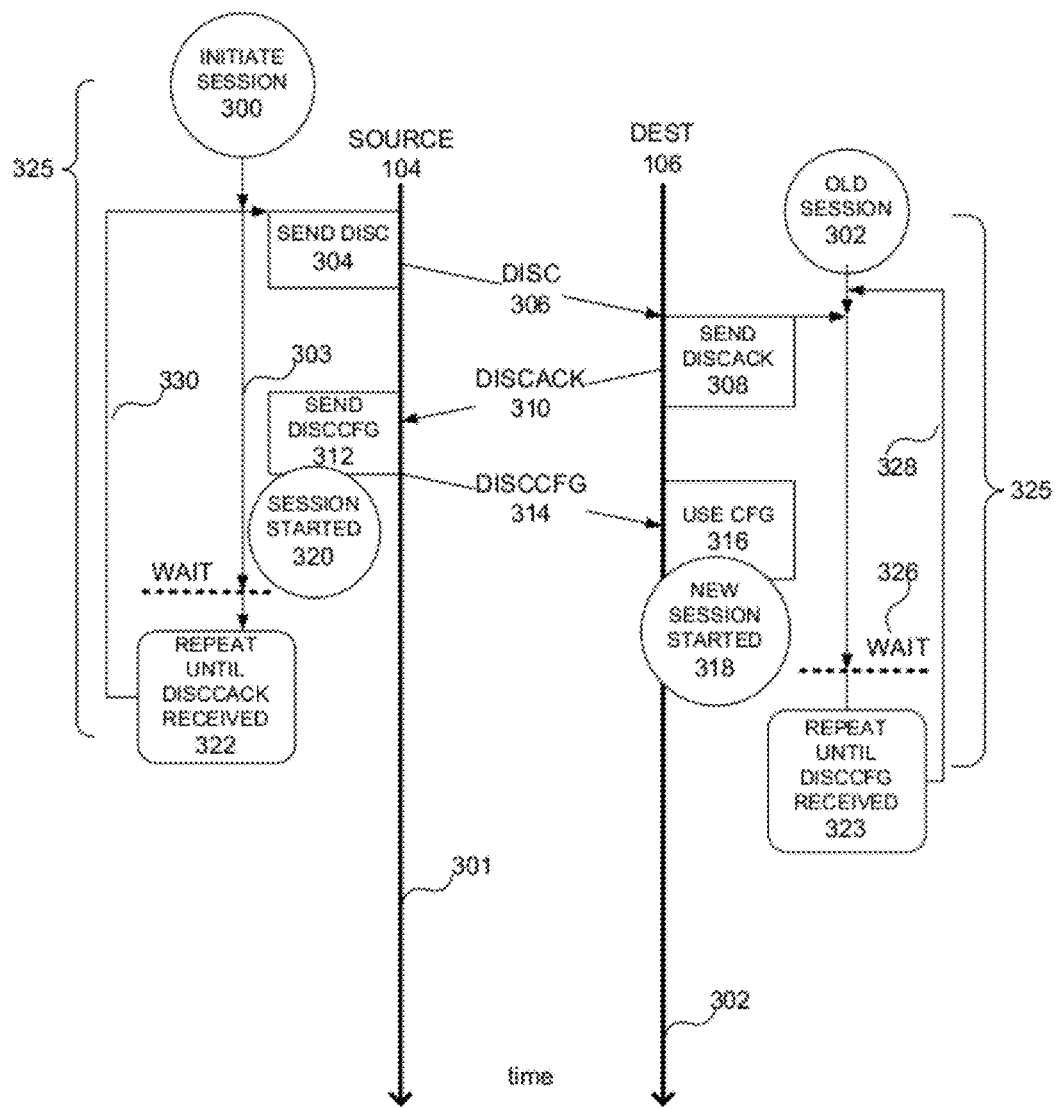
FIG. 3A illustrates a synchronous discovery process timing diagram.

FIG. 3A shows source and destination timelines 301 and 302 for a synchronous example of a discovery process for establishing a session between two networked devices, a source 104 and a destination device 106 in order to illustrate the drawbacks of a synchronous discovery process. On session initiation 300, the source 104 sends out 304 a discovery message DISC 306 to the destination 106. On receipt of the DISC message 306 by the destination 106, it responds by sending 308 a DISCACK 310 message back to the source 104. On receipt of the DISCACK 310 message at the source 104, the source 104 has confirmation of the receipt of the DISC message 306 by the destination device 106 and so it starts a new session 320 for future communication with this destination device 106 and sends 312 the destination configuration information in a DISCCFG 314 message. On receipt of the DISCCFG message 314, the destination device 106 has confirmation that the source 104 received its messages 310 and it creates a new session 318 at the destination device 106 to communicate with the source 104.

When the number of destinations 106 that might respond and participate is unknown, the source 104 has to wait a fixed period of time 303, a worst case time, for all the potential destinations 106 to respond with a DISCACK 310 message.

Furthermore, if the underlying IP network 120 is unreliable (i.e. it drops transport packets), as is the case with UDP and more so with Wi-Fi (where RF noise and interference can cause packets to be dropped), then any of the messages DISC 306, DISCACK 310 and DISCCFG 314 may not reach their intended recipients. Therefore, the source 104 and destinations 106 may have to repeat 322, 323 the discovery process 325 a number of times. With an unreliable transport 120, even with many repeats 322, 323 there is a possibility that this process 325 will fail.

So, in this approach, the wait 303 has to be designed for the worst case time it takes a destination device 106 to respond to a DISC message 306 and this wait 303 cost must be incurred even if all the destinations 106 respond promptly most of the time. Similarly a wait 326 is incurred at the destination 106 end waiting for a DISCCFG 314 message.

Figure 2B:
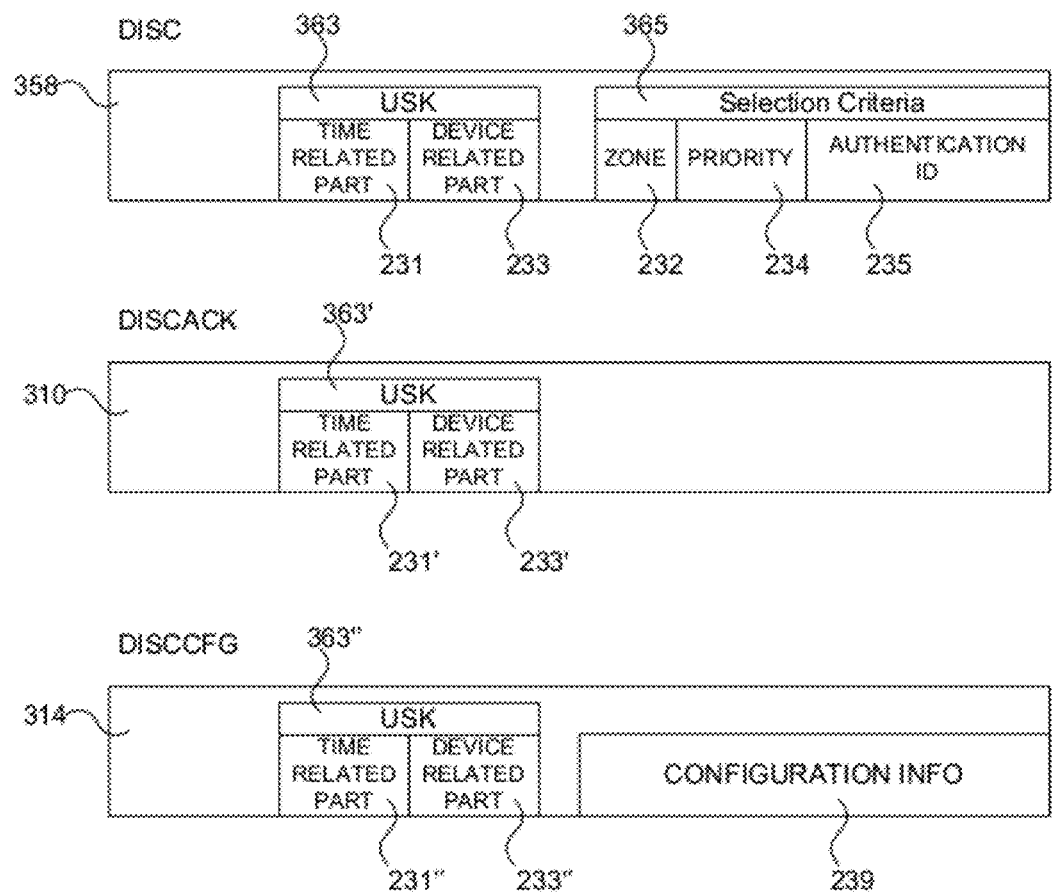
FIG. 2B illustrates the discovery messages and key elements of their content in accordance with one embodiment.

When the user presses the play button 204, shown in FIG. 2B, discovery 361 should take place quickly and playback should start promptly and the user interface should go into the media source UI state playing 238 as soon as possible. If this process is slow, the system may seem unresponsive and undesirable to the user.

Figure 3B:
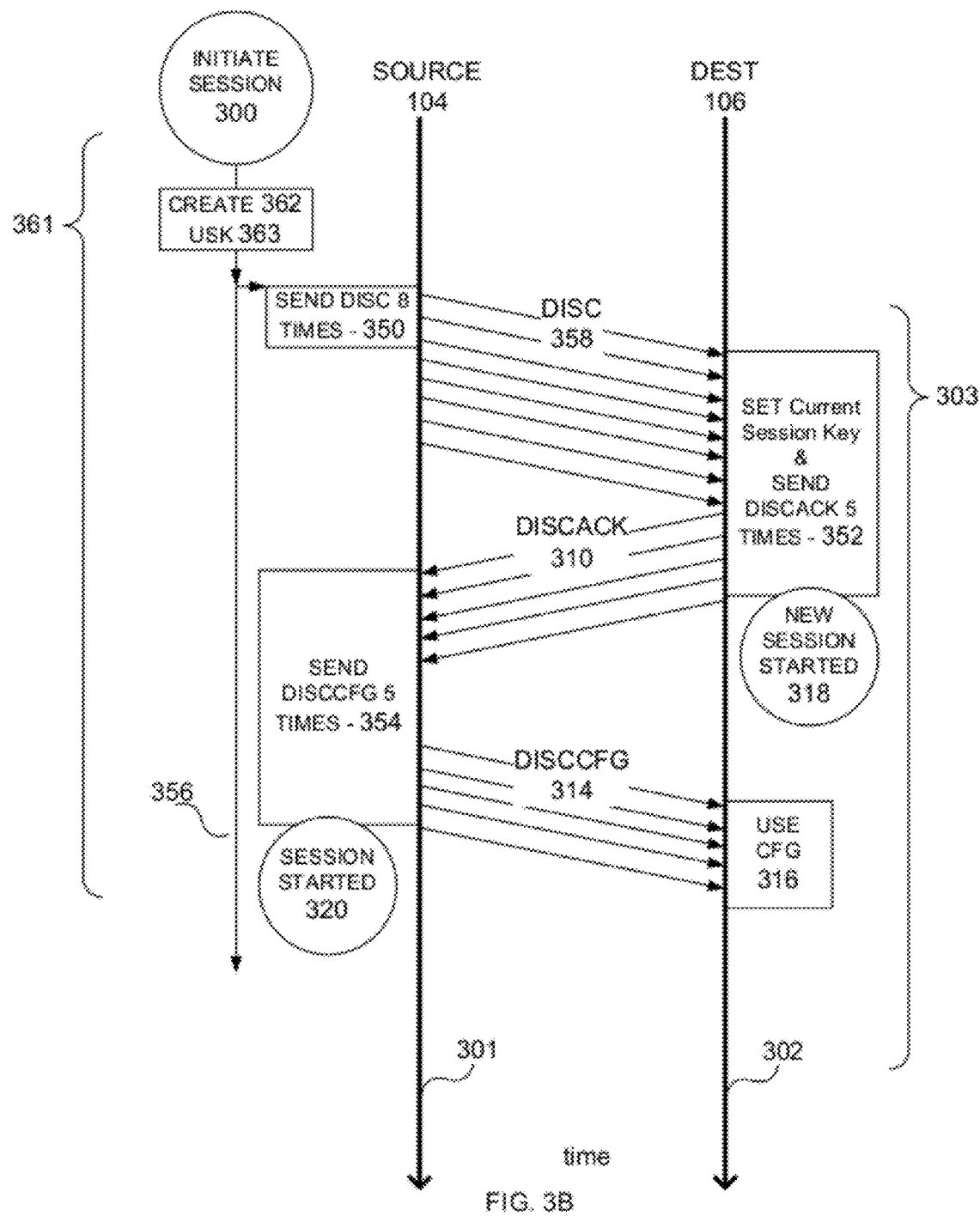
FIG. 3B illustrates an asynchronous discovery process timing diagram in accordance with one embodiment.

According to the preferred embodiment of the present invention, the asynchronous discovery process 361 as shown in FIG. 3B is used. It should be noted that unlike in the synchronous process shown in FIG. 3A, in the asynchronous process of the present invention shown in FIG. 3B, there are no repeats or waits involved. To eliminate the repeat step 322 of the synchronous process shown in FIG. 3A, each message in each step is sent several times to account for possible packet loss on the network 120. In this case, the start of a new session cannot be identified just by the receipt of a new DISC 306 message and instead needs to be qualified further.

(1) On the initiation 300 of discovery the media source 104 creates 362 a Unique Session Key (USK) 363. The USK 363 needs to be both unique in time and unique in the universe of possible devices 104 and 106. According to the present invention, the USK 363 is a combination of a time related part (in particular, a local hardware clock count) and a device identifier related part (in particular, the source devices 104 Ethernet or Wi-Fi MAC address). Each device 104, 106 in this system 100 is network enabled and since all network-enabled devices have a globally unique MAC address, this is used to provide the unique device-identifier part of the USK 363. A hardware clock is used to create the time related part to ensure that this is unique each time a new session is initiated by the same source device 104. It is possible to use other combinations of information, such as serial numbers or IP addresses and counters, to create a device and time unique session key.

(2) The media source 104 then multicasts 350 a 'device discovery' message DISC 358 to a global address received by all destinations 106 on the network 120, together with additional information.

Figure 2C:
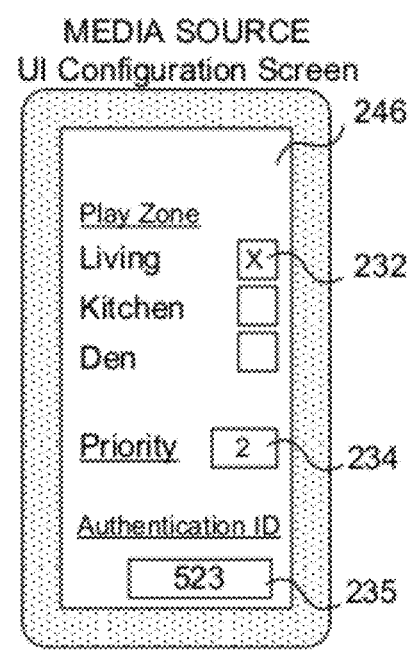
FIG. 2C illustrates the user interface configuration screen in accordance with one embodiment.

As shown in FIG. 2B the DISC message 358 includes the session key (USK) 363 that it created for this new session and destination device 106 discovery selection criteria 365 such as the Zone 232, Priority level 234 and authentication ID 235 being selected by the source for this session. These destination device 106 discovery selection criteria is defined by the user at the source device 104 using a Media Source UI Configuration Screen as shown in FIG. 2C.

This DISC message 358, shown in FIG. 3B, is repeated 8 times to increase the probability that all destinations 106 will receive it. If the probability of a message being dropped is P, the probability of it being dropped n times in a row is $P^n$. The probability of a DISC message 358, which is a multi cast message, being dropped is approx 1 in 3. Therefore to keep the probability of the DISC message 358 being dropped to less than 4%, this message must be repeated more than 3 times. However, if the message is repeated too many times, the network 120 will be flooded with excess messages during the discovery process. The number of times the DISC message 358 is repeated is preferably between 3 and 15 and more preferably between 5 and 12 and still more preferably between 7 and 9 and most preferably 8. For this invention, a value of 8 is used. I.e. the DISC 358 message is resent in step 350 8 times.

This DISC 358 is a multicast message sent to all destinations in the network.

(3) All destinations 106 that receive the DISC message 358 over the IP network 120 compare the selection criteria 365 in the message 358 to their local configuration, which includes information on what zones, priority levels and authentication IDs it will function for. If the destination device 106 does not meet the zone, priority and authentication ID selection specifications 365, the destination device 106 ignores the DISC 358 message.

Meeting the zone specification means the destination device 106 is enabled for one or more of the selected zones specified in the DISC 358 message. Meeting the priority specification means the destination device 106 device has an equal or higher priority level as the selected priority 234 specified in the DISC 358 message. Meeting authentication ID specification means the destination device 106 is enabled with an authentication ID that is the same as the authentication ID 235 specified in the DISC 358 message.

If the destination device 106 meets the zone, priority and authentication ID selection specifications 365 of the DISC message 358, the device 106 compares its current session key to the session key USK 363 sent in the DISC 358 message. If the session USK 363 is the same as the current session key at the destination device 106, this means this message 358 is a repeat of a previous DISC 358 message and the message 358 is ignored. This allows the source device 104 to repeat a DISC 358 as many times as needed to overcome the unreliability of the network.

If the USK 363 in the DISC message 358 does not match, the key at the destination device 106, the destination device 106 updates 360 its key to the new USK 363 value that it received and starts a new session 318. This is a key point in the method of the present invention: A new session 318 is started at a destination device 106 whenever a DISC message 358 is received with a different USK 363 from the current session key at the destination device. This means the session key will change at a destination device 106 only once for each discovery session initiated by the media source 104.

(4) If a new session 318 is started at the destination device 106, it responds to the initiating DISC message 358 from the initiating source 104 with 5 discovery acknowledge DISCACK 310 messages, each DISCACK message 310 includes the destinations specific IP address, role (left or right channel speaker, or video) and other configuration and media session information.

The destination device 106 sends 5 discovery messages to account for potential packet loss during communication over the network 120. The DISCACK message 310 is sent as a unicast message. Unicast messages can have a higher priority for transmission by network 120 devices than multicast messages and therefore have a lower probability of being dropped or lost.

The probability of a DISCACK message 310, being dropped is approx 1 in 5. Therefore to keep the probability of the DISCACK message 310 being dropped to less than 1%, this message must be repeated more than 4 times. However, if the DISCACK message is repeated too many times, the network will be flooded with excess messages during the discovery process 361. So the number of times the DISCACK message 310 is repeated is preferably between 3 and 10 and more preferably 4 and 8 and most preferably 5.

Once the destination device 106 receives the DISC message 358 and sets its current session key to a new value, it can accept any messages from the source 104 that are part of this new session 318, including media data from the source 104. The destination device 106 does this by comparing the value of the session key in each message from the source 104 with its current active session key. If these values match, then the message is accepted and processed as received. If the values do not match, the message is ignored. Furthermore, the destination device 106 includes the USK 363 value, in every message it sends to the source 104.

Upon receipt of discovery acknowledge DISCACK messages 310 from each destination 104, the source 104 checks if the session key of the DISCACK message 310 matches the USK 363 it sent out in its DISC message 358. If the session key of the DISCACK message 310 does not match the USK 363 sent by the source 104 in the DISC message 358, the source 104 will ignore this DISCACK 310. This can happen if the DISCACK 310 was meant for another source 104 that sent out a DISC message 358 more recently.

If the session key of the DISCACK message 310 matches the USK 363, the source 104 begins a source session 320 for that destination device 106 and sends 354 the destination device 106 configuration information in 5 discovery configuration DISCCFG messages 314.

The probability of any particular DISCCFG message 314, which is sent as a unicast message, being dropped is approximately 1 in 5. Therefore, to keep the probability of the DISCCFG message 314 being dropped by the network 120 to less than 1%, this message 310 is repeatedly sent more than 3 times. If the message 314 is sent too many times, the network 120 will be flooded with excess messages during the discovery process 361. So the number of times the DISCCFG message 354 is sent is preferably between 3 and 10, more preferably between 4 and 8 and most preferably 5. On receipt of the DISCCFG message 314, a destination device 106 will use 316 the configuration information in the DISCCFG message 314 to set itself up to process media it receives during the rest of the session 318.

Figure 3C:
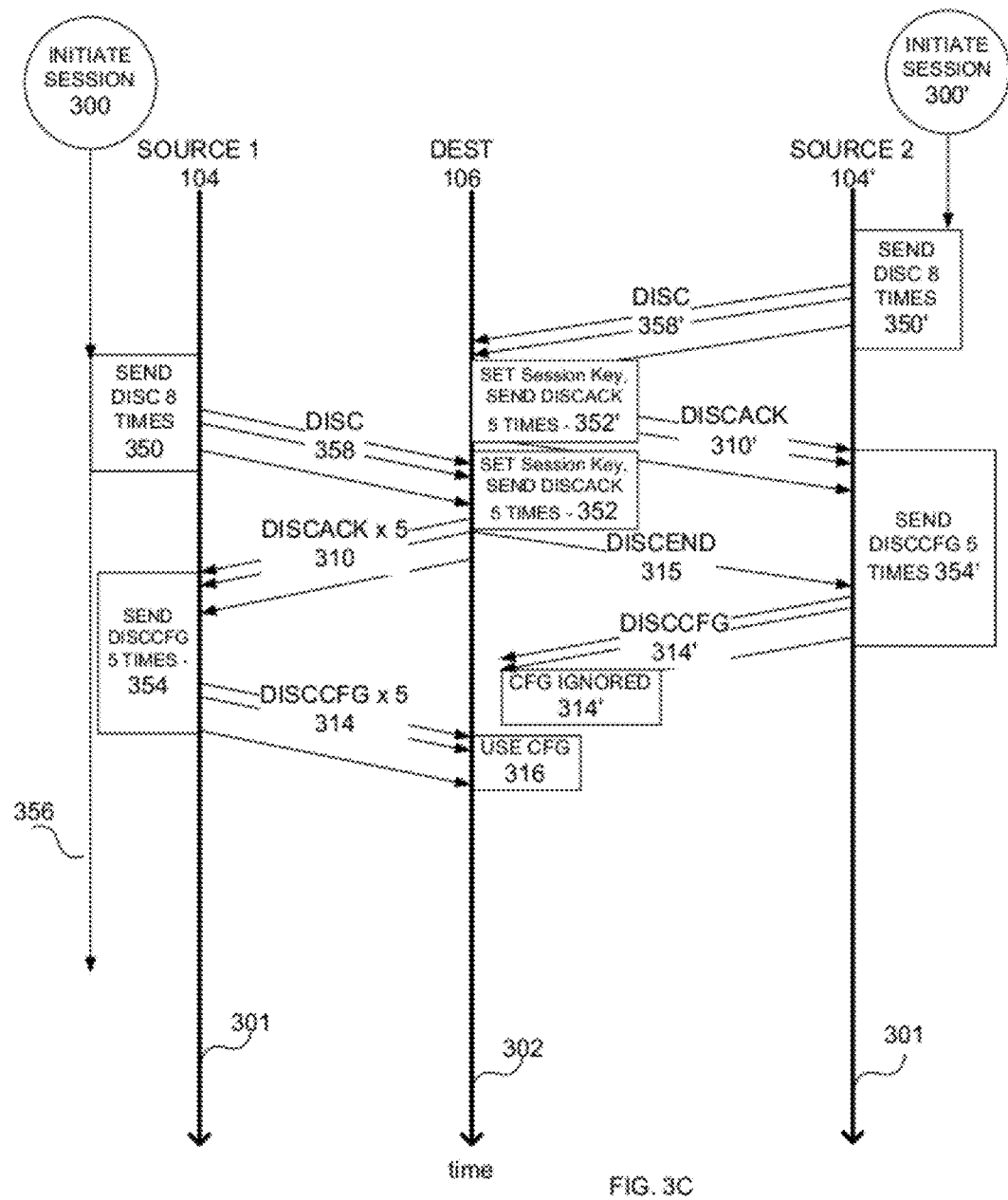
FIG. 3C illustrates an asynchronous discovery process timing diagram with two source devices in accordance with one embodiment.

FIG. 3C illustrates what happens with the system of the present invention when two sources 104 and 104' initiate sessions 300 and 300' at approximately the same time. As shown in FIG. 3C, a first source device 104 sends 350 a DISC message 358 after a second source device 104' has sent 350' a discover message 358'. The destination device 106 responds to both DISC messages 358 and 358' by sending out DISCACK message 310, 310'. However, the destination device 106 sets its session key initially to the USK 363' of the second source device 104' upon receipt of the DISC message 358', at step 352', but upon receipt of the DISC message 358 from the first source device 104, it resets the session key to the USK 363 of the DISC message 358 from the first source device 104. Therefore, all subsequent communications from the second source 104', including its DISCCFG messages 314' sent at step 354' are ignored. However, the DISCCFG messages 314 sent at step 354 by the first source device 104 are utilized 316 by the destination device 106. The session started at step 352 by the destination device 106 with the first source device 104 can now continue on to receiving media (streaming media) from the first source device 104 and the destination device 106 can render (play) this media.

If the destinations 106 are already in a session with a previous source device 104, each destination device 106 that starts a new session will send a discovery ended DISCEND 315 message to the source 104 it was in session with previously. In this case, the destination device 106 initially sets its session key at step 352' to the USK from the second source device 104'. Then on receipt of the DISC message 358 from the first source device 104, the destination device 106 will send a DISCEND message 315 to the second source device 104'. This will inform the second source device 104' of a session end and cause the second source device 104' to terminate the new session and stop streaming. The destination 106 will then respond to the discovery messages DISC 358 from the first source device 104.

Similarly, utilizing the process shown in FIG. 3C, while a first source device 104 is streaming media to destination device 106, a second source device 104' may initiate discovery with the destination device 106, causing the destination device 106 to stop playing the media from the first source device 104 and to start playing media from the second source device 104'. The second source device 104' may in turn be preempted by a third source device (not shown) or the first source device 104 again.

According to the present invention, the system is enabled, based on zone or priority level settings, so the first source device 104 will only preempt streaming to specific destination devices 106 and only those destination devices 106 will start rendering the media stream from the first source device 104.

Automatic Online Process

Figure 3D:
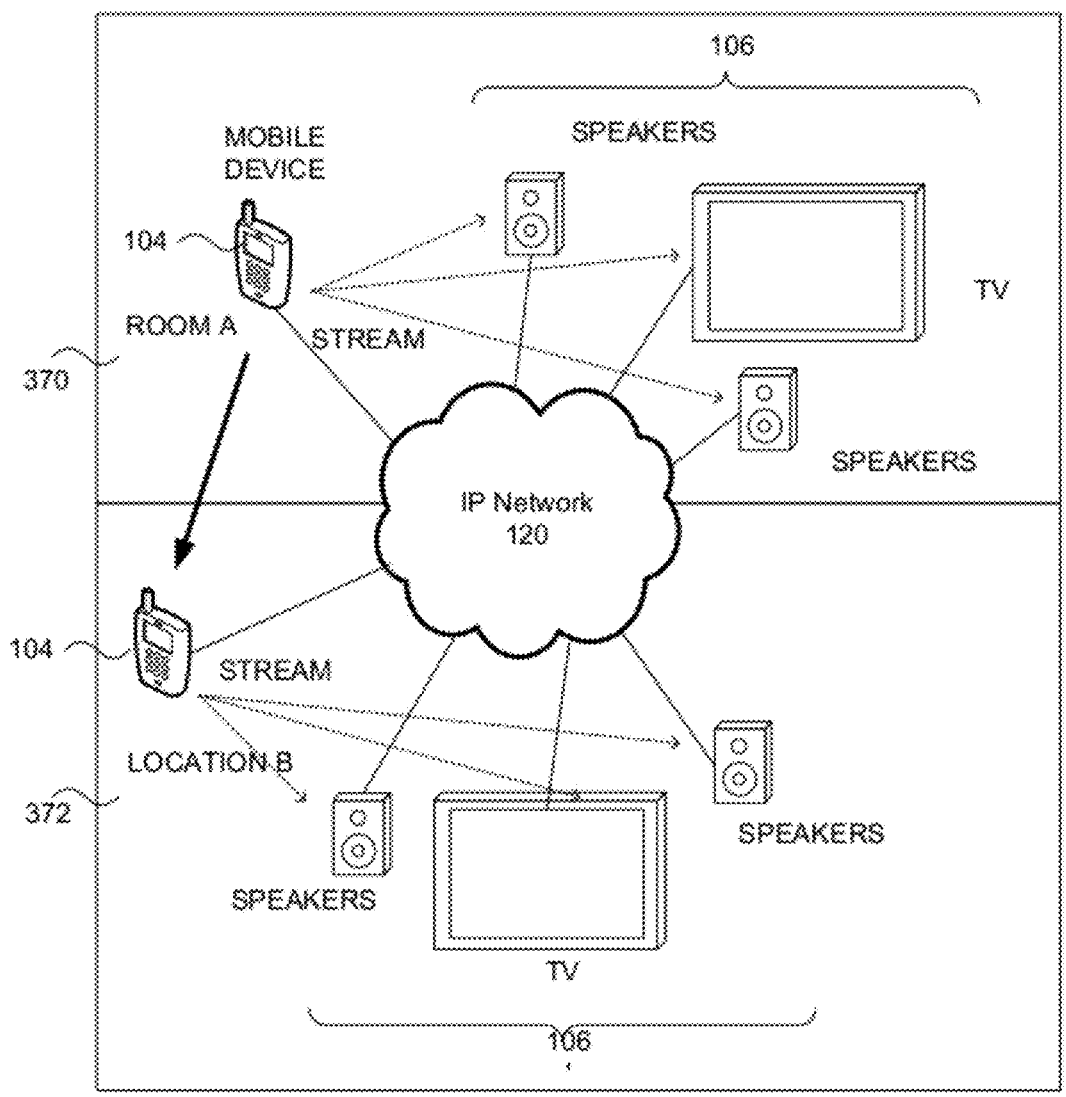
FIG. 3D illustrates the effect of a media source moving from one room to another.

The system of the present invention allows destination media devices 106 to dynamically join and leave a group of destination devices 106 rendering media rapidly and without user intervention. For instance, as shown in FIG. 3D a user with a handheld source device 104 may be in a first room 370 playing media to one or more destination devices 106, that are in that first room 370. The user with the handheld source device 104 then moves with the handheld source device 104 to a second room 372 that also has one or more destination devices 106'. The destination devices 106 in the first room 370 will drop out of the media source device session 320 if they fall outside the Wi-Fi IP network 120 communication range from the location 372 of the source device 104, and the destination devices 106 in the second room 372 will join the media source device session 320 as they come into IP network 120 communication range of the location 372 of the media source device 104. According to the system of the present invention the transition between destination devices 106 occurs without interrupting the streaming of media in the media source session 320.

Each media source 104 periodically (according to the preferred embodiment, preferably every 15 to 180 seconds, more preferably every 30 to 90 seconds, and most preferably roughly every 60 seconds) broadcasts device discovery DISC messages 358 during a media session. New destination devices 106 that have come online on the IP network 120 or within range of the source device 104 will receive these DISC messages 358 and respond as above, which will allow them 106 to be dynamically discovered by the source 104. Once discovered, these destination devices 106 will automatically be included in and participate in the playback of the media according to their roles. Since discovery messages DISC 358 are sent out with the same USK 363 by the source 104 repeatedly during a media session, and since destinations 106 can respond to these DISC messages 358 at any time with a DISCACK 310 message, new destinations 106 may be automatically included in the current source session 320 during the media rendering portion of a session 320.

Each destination device 106 also periodically (according to the preferred embodiment, preferably every 15 to 180 seconds, more preferably every 30 to 90 seconds, and most preferably roughly every 60 seconds) multicasts an 'available for discovery' DISCAVAIL message to a global address. Any media source devices 104 within range will receive this DISCAVAIL message and send out another discover DISC message 358 if this available destination device 106 is not already included in the current session 320. The receipt of the DISC 358 message and the sending of the DISCACK response 310 by the destination device 106 will allow it to be included in the current session 320. This allows a new destination device 106 that comes online or within range, to not have to wait for a source device's 104 periodic DISC message 358 to be received, before it can be discovered by the source.

The period for both broadcasting DISC messages 358 from the source devices 104 and DISCAVAIL messages from the destination devices 106 is chosen to be frequent enough to detect changes at reasonable rates in the state or location 370,372 of devices 104, 106, but not so frequent that it occupies the network 120 with traffic that is needed only infrequently.

Each destination device 106 has a range threshold that it uses to determine if it is within Wi-Fi IP network communication range of the source device 104. If the signal strength of the Wi-Fi IP messages the destination device 106 receives from the source device 104 are above this threshold, then the destination device is within communication range of the source device 104. If the signal strength of the Wi-Fi IP messages the destination device 106 receives from the source device 104 is below this threshold, or the destination device 106 receives no messages from the source device 104, then the destination device 106 is outside the communication range of the source device 104. Therefore with this range threshold set, the destination device 106 will leave a media session 320 by sending an end discovery DISCEND message to the source device 104, if it is already in a session 320 with the source device 104 and if the Wi-Fi signal strength of messages from the source device 104 falls below a threshold or are no longer being received. The destination device 106 will only allow itself to be discovered, by responding with a DISCACK 320 message, if the Wi-Fi signal strength of DISC messages 358 it receives from a source device 104 are above the range threshold.

Therefore this mechanism is a test of the proximity of the source device 104 to the destination device 106, and allows destination devices 106 to enter or leave a media source 104 session 320 based on the proximity of the media source 104 to destination devices 106.

2. Dual-Communication Channel Synchronization

For large-area deployments of destination devices 106, an IP network alone 120 may not be sufficient to effect synchronization of the destination devices 106. In a large area network the IP network topology may include multiple layers of network devices such as routers and bridges, adding unpredictable network transmission delays and making it difficult to synchronize destination devices 106. For instance, if the area is large and Wi-Fi is used, a single Wi-Fi access point (AP) is not enough to cover the area. Then many APs will be needed and this will make synchronization of devices across the network difficult. An example of such a situation would be a sports stadium or large area campus that wants to use IP addressable destination devices for rendering audio and video media.

Figure 4A:
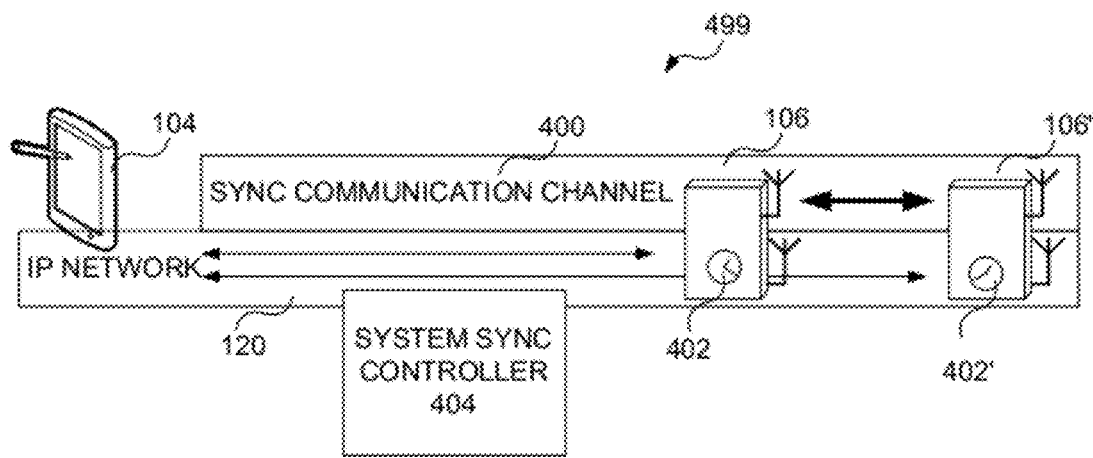
FIG. 4A illustrates an overview of a dual communication channel sync system in accordance with one embodiment.

Therefore, according to the present invention, for large area configurations the dual-mode communication system 499 shown in FIG. 4A is used to effect synchronization. The media to be played by the destination devices 106 is transmitted to the destination devices 106, 106', referred to generically or in combination henceforth with the single reference numeral 106 over the IP network 120. However, the synchronization of these destination devices 106 is done with an additional communication channel, the sync communication channel 400. It should be noted that the source device 104 is not interfaced to the sync communication channel 400. However, according to an alternate embodiment one or more of the source devices 104 is also interfaced to the sync communication channel 400.

According to the present invention, each destination device 106 has two communication mechanisms, one based on the IP network 120 and one based on the sync communication channel 400. The sync communication channel 400 operates via radio communication, preferably in the 2.4 GHz band. In alternative embodiments, this sync communication channel 400 may be based on a number of other communication methods, including audio, infra red or optical. Each destination device 106 also has a local clock 402 which used for synchronization with the other destination devices 106, as is discussed in detail below. The time setting of the local clock 402 at the destination 106 and the clock rate are modifiable by the destination device 106.

The destination devices 106 implement a method as described below to synchronize themselves using the sync channel 400. It is important to note that on the IP network 120 is a system sync controller 404 which enables and disables synchronization of any destination device 106 by sending messages to the destination devices 106 over the IP network 120. Furthermore, the IP network 120 is used to send the media from media sources 104 to the destination devices 106 and control the activity of the destination devices 106 from the sync domain controller 404. Any destination device 106 can also send messages, including synchronization enable and disable confirmation messages, to the system sync controller 404 over the IP network 120.

Figure 4B:
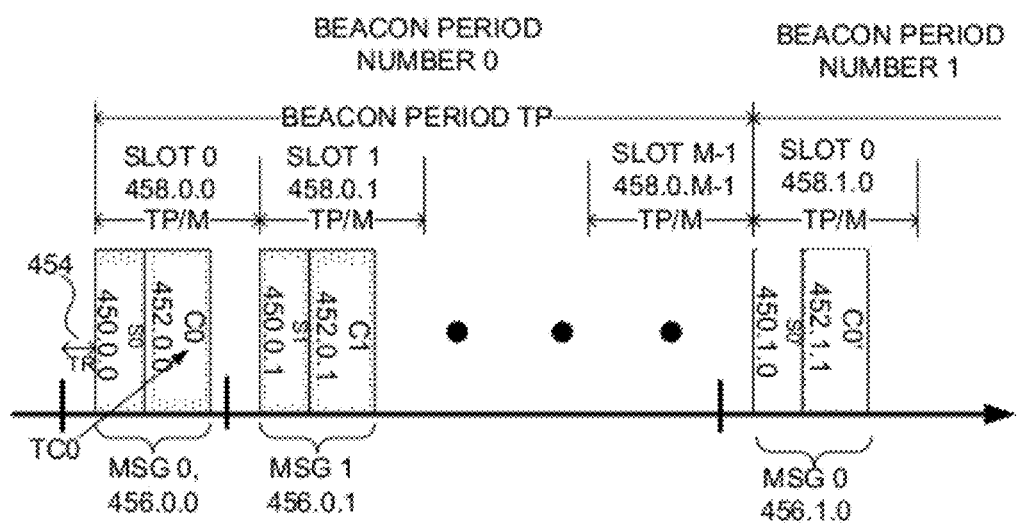
FIG. 4B illustrates sync beacon and slot timing in accordance with one embodiment.

As shown in FIG. 4B, the sync system operates by having each destination device 106 transmit a periodic beacon message 456 in the sync channel 400, shown in FIG. 4A, with beacon period TP. The beacon period TP is divided into a number M of beacon slots 458, so each slot 458 has a length of TP/M. (According to the method of numbering in the present specification, the nth beacon message in the mth beacon period is assigned reference numeral 456.*m.n.*) Each destination device 106 has the ability to receive other beacon transmissions with their beacon message 456 when not transmitting to the sync channel 400 and to record the moment of receipt of the start of a received beacon message 456 using the local clock 402, shown in FIG. 4A, in each destination device 106. Each destination device 106 further has the ability to adjust both the value and clock rate of the local clock 402.

A beacon message 456 consists of an 8-bit beacon slot number Sm 450 and a 64-bit local clock value Cm 452, where this local clock value 452 is in microseconds. The local clock value Cm 452 is read at time TC0, which is a fixed number of microseconds TR 454 before the transmission of the beacon message 456. The beacon message 456 may also include a cyclic redundancy check CRC or another mechanism to help verify the integrity of the beacon message 456.

In the preferred embodiment of the present invention, the beacon period TP is 1 second and the number M of slots 458 is 100. This means each beacon slot 458 has a length of 10 milliseconds. According to the preferred embodiment, the beacon message 456 has an 8 bit slot code 450, a 64 bit local clock value 452 and an 8 bit CRC, so each beacon message 456 is 80 bits long. Since this message 456 is to be transmitted within 10 milliseconds, the slot 458 width, the required bit rate is 8000 bits per second. This is a low bit rate for modern RF transceivers, making the sync channel 400 hardware relatively low cost. A beacon slot length TP/M of more than 10 milliseconds does not provide any cost benefit as 8000 bits per second is already slow and a longer beacon slot length (TP/M) would only serve to reduce the number M of beacon slots 458 in a beacon period TP. The beacon period TP may be kept very low at 1 a second period as the destination devices 106 do not move or become active or inactive very frequently. If the beacon period TP is set considerably lower than one second, it inordinately reduces the number M of slots 458 available. If the beacon period TP is considerably greater than one second, the time required for synchronization becomes noticeable to the user.

The beacon period TP and the number M of beacon slots 458 is communicated via the IP network 120 to all destination devices 106, and may also be communicated via the beacon messages 456.

On power up, each destination device 106 will not synchronize until enabled by the sync domain controller 404. When multiple destination devices 106 are to be enabled, they are enabled in sequence by the sync domain controller 404, so that at least 1 beacon period separates the enablement of each consecutive destination device 106 to be in the system.

When enabled, a destination device 106 initiates syncing by listening on the sync channel 400 for 10 beacon periods TP for the presence of other beacon transmissions 456, before making any transmissions on the sync channel 400.

The first destination device 106 to be enabled does not hear any other beacon transmissions and starts transmitting beacon messages 456.0.0, 456.1.0, 456.2.0, etc. with beacon period TP in slot 0-458.m.0.

The second destination device 106' (shown in FIG. 4A) to enable will hear the first destination device's 106 beacon messages 456.m.0. The second destination device 106' records the beacon period TP of the first device 106 using its local clock 402', and determines the clock rate of the first destination device 106 relative to its own clock rate and adjusts the clock rate of its clock 402' to match the clock rate of the first destination device 106.

In addition, the second destination device 106' uses the absolute value C0 of the first device's 106 local clock 402, which it receives in the clock portion 452.m.0 of the beacon messages 456.m.0, to set the absolute value of its clock 402'. This clock rate and absolute clock value adjustment by the second destination device 106' is a continuous process where filtering is applied to avoid over-corrections due to effects such as wireless RF transmission and receipt jitter during communication in the sync channel 400 as well as local clock 402 computational accuracy. The second destination device 106' makes an initial clock rate adjustment within 10 beacon periods TP of receiving the beacon message 456 from the first destination device 106.

Once the second destination device 106' has performed its clock 402' rate adjustments, it transmits its own beacon message 456.m.1 in the next beacon slot position available, i.e., slot 1 458.m.1, repeating this beacon message 456.m.1 periodically at the beacon period TP. Similarly, the third destination device 106" and subsequent destination devices 106 to will perform analogous actions as those described above for the second destination device 106'. The third destination device will start transmitting a beacon message 456.m.2 in the third beacon slot 458.m.2 at period TP, and fourth destination device 106 will transmit beacon messages 456.m.3 in the fourth beacon slot 458.m.3 at period TP, etc., until all M slots 458 are occupied.

However, if during syncing, a destination device 106 finds an empty slot 458 between used slots 458, it will pick the lowest such available slot 458 for its beacon messages 456. This allows destination devices 106 to drop out of the communications and new destination devices 106 to come in and occupy previously occupied slots 458.

If there are more than M destination devices 106, the additional destination devices 106 perform the same syncing operations described above as for the second destination device to adjust their 106 clock 402 rates, but they do not transmit any beacon messages 456. However, all destination devices 106 receive all the transmitted beacon messages 456. If any destination device 106 detects a slot 458 with beacon messages 456 that are repeatedly garbled or corrupted, it 106 will flag that slot 458 as being corrupted and send a message to the system sync controller 404. This can occur if two or more destination devices 106 are enabled at exactly the same time and choose to transmit beacon messages 456 in the same beacon slot 458. (Slot corruption messages sent to the system sync controller 404 can be sent over the IP network 120.) The system sync controller 404 will then disable all destination devices 106 transmitting in the garbled or corrupted slot 458 and then re-enable these destination devices 106 one by one so the destination devices 106 can find different free slots 458 in which to transmit beacon messages 456.

The above-described sync process according to the present invention is simple and yet effective in the synchronization of a large number of destination devices 106 within overlapping communication range of each other 106.

Figure 5:
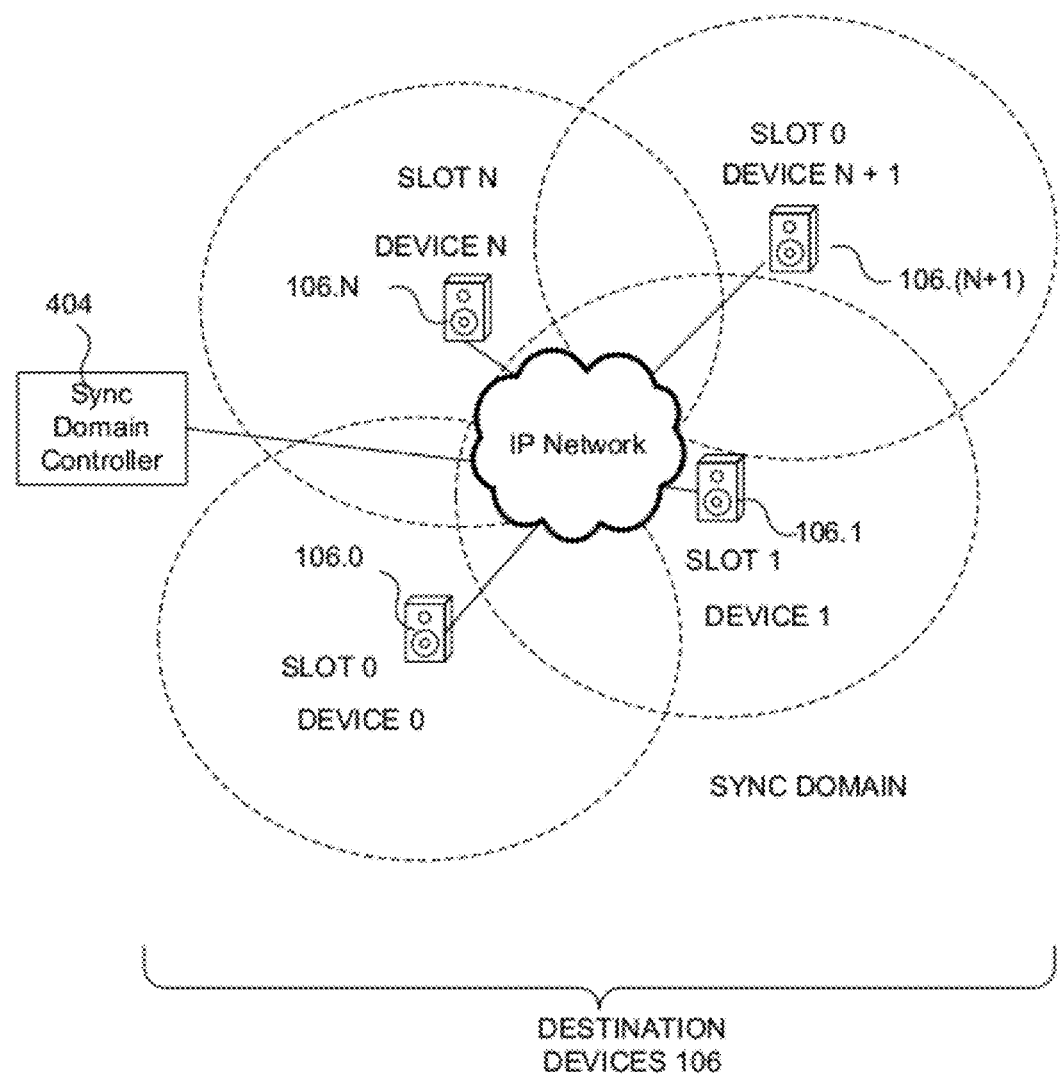
FIG. 5 illustrates sync domains and slot overlap in accordance with one embodiment.

Each destination device 106 acts as both a receiver of sync info from its neighbors 106 and transmits sync information to its neighbors 106, so each destination device 106 acts as a repeater for the sync information. It should be noted that because destination devices 106 may be operating simultaneously but out of range of each other 106, the same slot 458 may be occupied by multiple destination devices 106 simultaneously. For instance as shown in FIG. 5, the N+1th destination device 106.(N+1) is out of range of the beacon message 456.X.0 transmission in slot 0 458.m.0 from destination device 0, 106.0. Therefore, transmissions from the N+1th destination device 106.(N+1) may also occupy slot 0 458.m.0.

According to the system of the present invention, adding a destination device 106 is as simple as powering it 106 on. It 106 will then synchronize its clock 402 to the clock value of the destination device with beacon messages in slot 0 and transmit its own beacon messages 456 on an open beacon slot 458 if one exists. Once synchronized, the clock 402 value at each destination device 106 is the same as the other destination devices 106 with which it 106 is in communication.

domain, it is desirable to designate destinations into groups and place bridges in the Media sent from a media source 104 contains the media as well as timing information on when it is to be rendered. Typically the local clock 402 at the destination 106 is used to time the rendering of the media the destination 106 is to render. Therefore if multiple destinations 106 are to render the media at the same time, the local clocks 402 at each of these destinations have to be synchronized to read the same time at any moment. The mechanism described above provides a means for doing that for large area deployments of destination devices 106.

Sync Domains and Bridges

Figure 6:
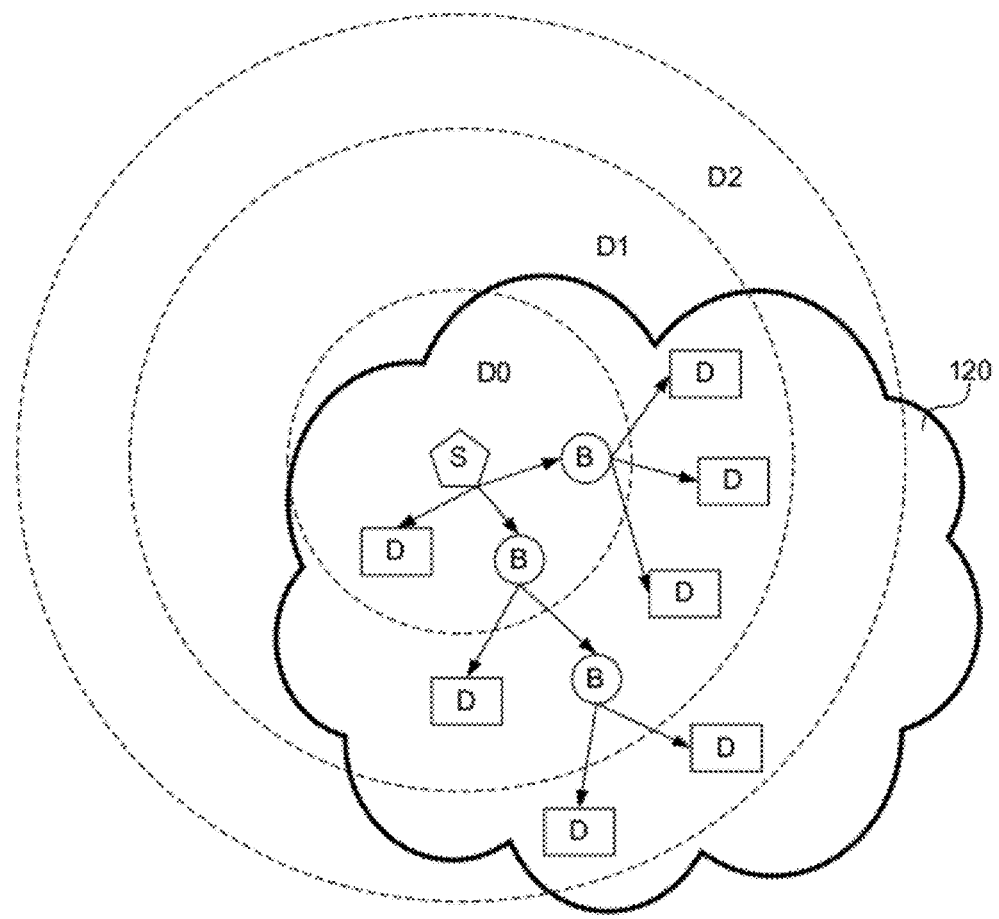
FIG. 6 illustrates a bridge system in accordance with one embodiment.

According to an alternate embodiment of the present invention, the source devices 104 and destination devices 106 are not connected directly but instead pass through a number of bridge devices as shown in FIG. 6. Each bridge device 600 acts as both a single media destination and a media source for all the destinations connected to it.

In such a media system each destination device 106 connected to a media source 104 or bridge 600, plays media at a fixed time delay from the time the media is sent by the source or received by its respective bridge.

The IP network path to each destination device may consist of a variety of routers, access points and bridges. This will cause the IP network path and therefore the network delays to be substantially different to each device in the system.

In such a system, for effective synchronization of all destination devices in the system such that the network delays from a bridge to each destination in a group is constant. An example of such a scheme would be a sync domain with two Wi-Fi BSS's and a number of Ethernet devices on a router.

For a large deployment with varied IP paths to the destinations, many bridges may be used to adjust the time delays to each destination to make them similar. The delay introduced by each bridge may be adjustable. This allows some bridges to delay the stream 2× the delay of other bridges, making the IP networking task easier.

Unicast Transfer and State Management

The device driver receives audio data in a variety of sample formats. Typically these are multi channel formats and consist of a sequential series of sets of audio samples. Each set represents a time instant and the individual samples in a set are audio data for each audio channel. If the audio data is a 5.1 channel stream, then each set will contain 6 samples, one for each of six channels. The time interval between each set of samples may be 1/44.1 kHz or 1/92 KHz etc, depending on the sample rate of the stream.

In this embodiment, each sample in each set is destined for a different destination. Therefore the 'multi channel' input stream is de interleaved into independent single channel streams. There will be as many single channel streams as there are channels in the input multi channel stream.

The transmission of each single channel stream to its independent destination is managed by a state machine per stream. These individual stream state machines may be in different states, depending on the dynamics of the transactions taking place between each source and its destination.

Stream Start/Stop

The destination provides the source state machine with its status, including information on its total buffer space used. If the destination buffers are empty, and new audio data is being received by the driver, the source state machine uses this information to indicate the start of a new stream. The start of a new stream causes the source state machine to perform additional management activities such as a time sync activity.

If the destination buffers fill to a pause threshold, the destination provides the source state machine with a pause stream message. This will cause the source to pause sending any further media data in that stream until further notice. When the destination has consumed the media in its buffers and the buffer level falls below a resume threshold, it will send the source state machine a resume stream message. This will cause the source state machine to resume sending media data for that stream. If while the source is paused, the driver continues to provide data such that the source buffers fill up, the source will drop all pending data and clear its buffers.

Source Rate Tracking

Figure 7A:
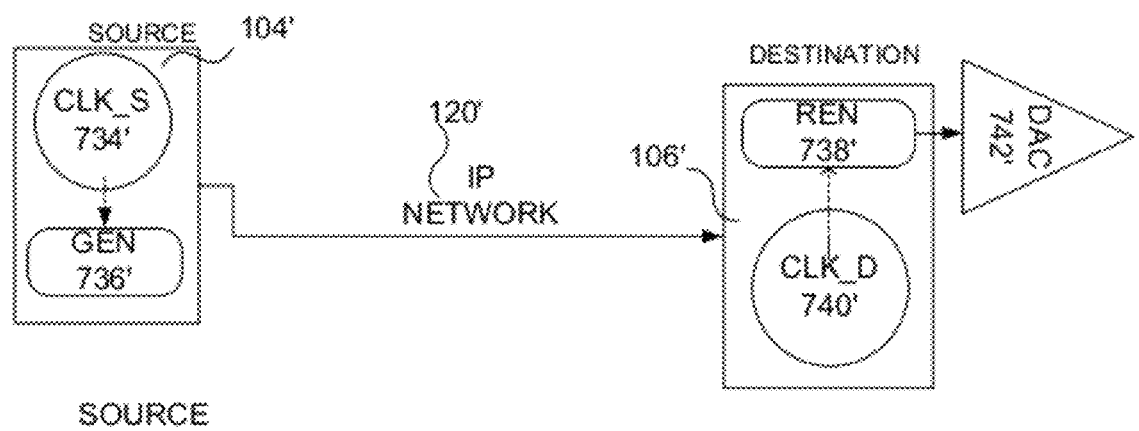
FIG. 7A illustrates a block diagram of a source and destination clocks in accordance with one embodiment.

In some situations, as shown in FIG. 7A, a media source 104' may provide media data via an IP network 120' to a destination device 106' at a precise rate known as the media sample or frame rate. For instance, if the media is audio, the sample rate is commonly 44.1 kHz. The accuracy of the rate at which the media source 104' produces the media (media samples if audio/frames if video) depends on the accuracy of the clock 734' at the media source 104'. The destination converts the digital data stream into an analog signal based on the sample/frame rate specified for the media. However, the clock 740' used by the destination 106' will generally have a slightly different rate from the clock rate of the media source 104'. If there is even a small difference, say a 0.5% difference in clock rates, then the destination 106' will have one sample too many or too few every 200 samples. Discontinuities of even one sample can produce aesthetically unpleasing audible 'pops' in audio by the rendering system 738'.

Figure 7B:
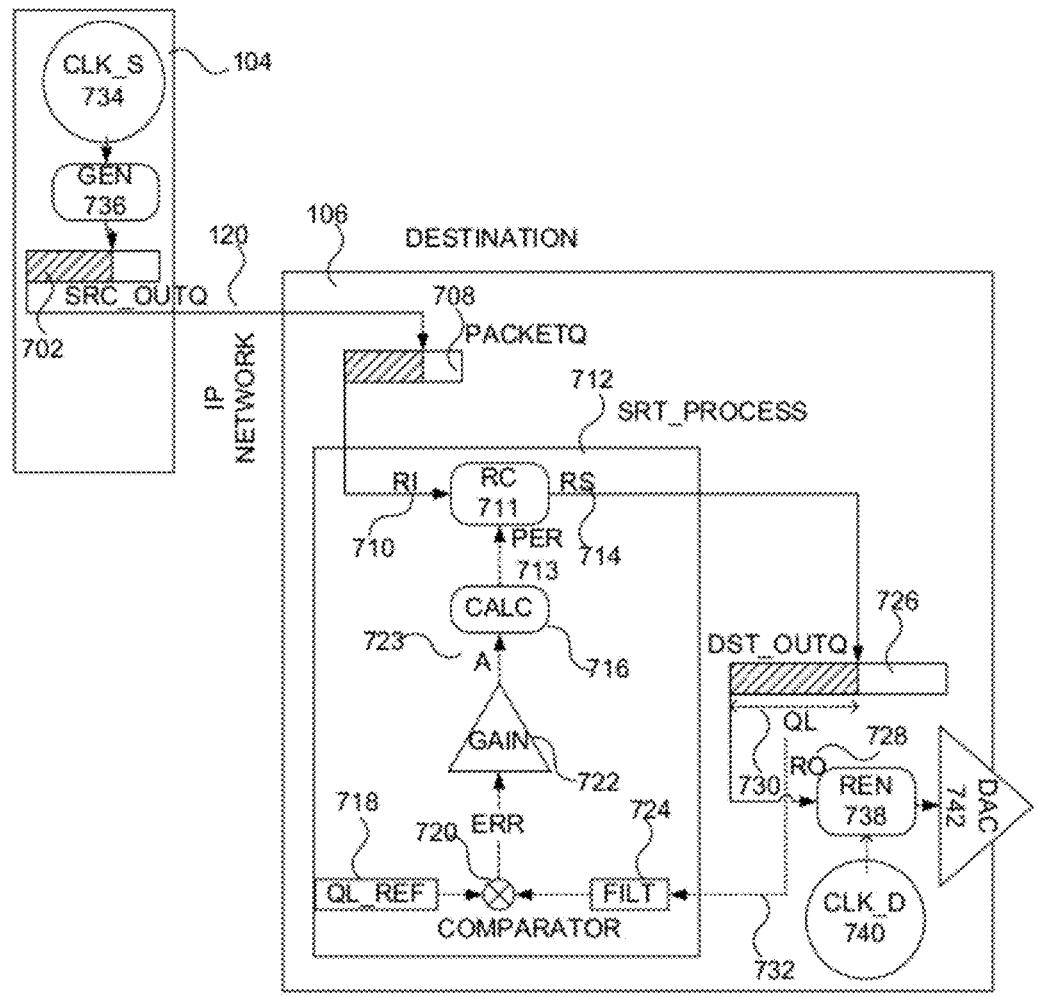
FIG. 7B illustrates a schematic of the source rate tracking components in accordance with one embodiment.

To overcome this, the system of the present invention performs source rate tracking when streaming media over an IP network 120. As shown in FIG. 7B, the system of the present invention consists of a media source 104 and one or more media destinations 106 (one of which is depicted in FIG. 7B) connected via an IP network 120. The media source has a media data queue, SRC_OUTQ 702, that contains media data that is fed into it by a media generator 736 at a constant rate, based on a media source clock 734, that is the media sample rate if it is audio, or the media frame rate if it is video. The media generator 736 may read the media data from an internal media file (not shown), or receive it from some other location (not shown) such as a network address, or may create it based on an audio data generation process using an audio data generator (not shown).

The media sent to the destinations 106 over the IP network 120 is taken from the media data queue 702. Each destination 106 has a destination packet queue PACKETQ 708 which receives the media data sent to it from the media source 104. The destination 106 has a source rate tracking (SRT) system 712 that removes media data from the PACKETQ 708 at rate RI 710 and outputs the media data into a destination output queue DST_OUTQ 726 at rate RS 714. A media renderer 738 takes 728 media data from the output queue DST_OUTQ 726 at rate RO and plays this media using a digital-to-analog converter (DAC) 742. The DAC 742 requires media data at a constant rate RO, and so the rendering process 738 removes media data from the output queue DST_OUTQ 726 at that rate RO 728. The rendering process 738 uses a destination clock CLK_D 740 to measure time intervals and remove media data at rate RO.

The source rate tracking system SRT_PROCESS 712 contains a rate converter (RC) 711, a gain component 722, a calculator 716, a comparator 720, reference value QL_REF 718 and a filter component 724. The length QL 730 is the number of samples that is present in the output queue 726 and is read 732 periodically by SRT_PROCESS 712. Length QL 730 is put through filter FILT 724, and filter FILT 724 outputs on each period (100 milliseconds) a filtered version of QL 732. The filtered version is the running average of the QL values read 732 over a number of R periods. Preferably, the number of R periods is between 4 and 20, more preferably between 7 and 15, and still more preferably around 10. If the number of R periods used is too small, the feedback system of SRT_PROCESS 712 becomes unstable, and if the number R is too large, the tracking becomes unresponsive. Each period the QL_REF value 718 is compared with the output of the filter 724 by the comparator 720 which generates an error value ERR. This value is fed into the gain component 722 which multiplies the error value ERR by a gain value to produce gain output A 723. The gain factor used by the gain component 722 is preferably between 0.20 and 1.0, more preferably between 0.33 and 0.75, and still more preferably 0.5. According to the present invention a gain factor of less than unity and more preferably 0.5 is designed to slow the response of the SRT process 712 to fluctuations in rate RI. The output A 723 from the gain component 722 is directed to calculator 716 which scales A to generate a sample rate conversion percent PER 713. The rate converter RC 711 inputs samples at the rate RI 710 and outputs samples at rate RS 714 where $$RS=RI*(1+PER).$$

High-level processes according to the present invention are shown in FIGS. 7C.1, 7C.2, 7C.3 and 7C.4. The process of media playback by a source device 104 is shown in FIG. 7C.1. When media playback is initiated by a source device 104, the process 750 at the source 104 starts by sending 752 a media playback start time that is set some time in the future from the time of initiation. After this, the source device 104 repeatedly sends data 754.

As shown in FIG. 7C.2, media rendering by a media destination device 106 begins, according to process 756, with the destination device 106 receiving and storing 758 the start time and then repeatedly receiving 760 data from the source device 104 and storing 762 it in destination packet queue PACKETQ 708. A second process 764 at the destination device 106 takes 766 media data from the destination packet queue PACKETQ 708 and inputs 768 this data into the rate converter (RC) 712. The RC 712 monitors 784 the queue length QL 730, and compares this with a reference value QL_REF 718 as described above in conjunction with FIG. 7B. The RC 712 then outputs media data into the output queue DST_OUTQ 726 and steps 768, 770 and 772 of the process repeats as shown. In conjunction with this 764, another process 780 waits until the media playback start time is reached 774 and then checks 776 the queue length QL 730 of the output queue DST_OUTQ 726 and assigns the value to QL_REF 782. After doing step 776 the process 780 removes media data packets from the DST_OUTQ 726 and renders it using the rendering subsystem 742.

The process 750 at the source device 104 and the processes 756, 764, 780 at the destination device 106 end at the end of a media transfer session and go back to their respective START states.

The net effect of this process 756, 764, 780 is to detect a gradual increase or drop in media data in the DST INQ 726 buffer and convert this to the rate discrepancy percent value PER 713. A negative rate discrepancy PER value 713 signifies a need for down-sampling, i.e., a decrease in the sampling/ frame rate, and a positive value a need for up-sampling, i.e., an increase in the sampling/frame rate. For example, a −0.5% rate discrepancy would notify the SRC 711 to down sample by 0.5% or reduce the incoming samples/frames by 1 sample/ frame in 200.

According to the preferred embodiment of the present invention, when the PER 713 value is negative, the SRC 711 drops 1 in N samples/frames where −1/N equals the negative rate discrepancy percent value PER 713. And for positive PER values 713, the sample/frame rate converter 711 interpolates a new sample/frame between two other samples/ frames every N samples/frames where 1/N is the positive rate discrepancy percent PER value 713.

Figure 8A:
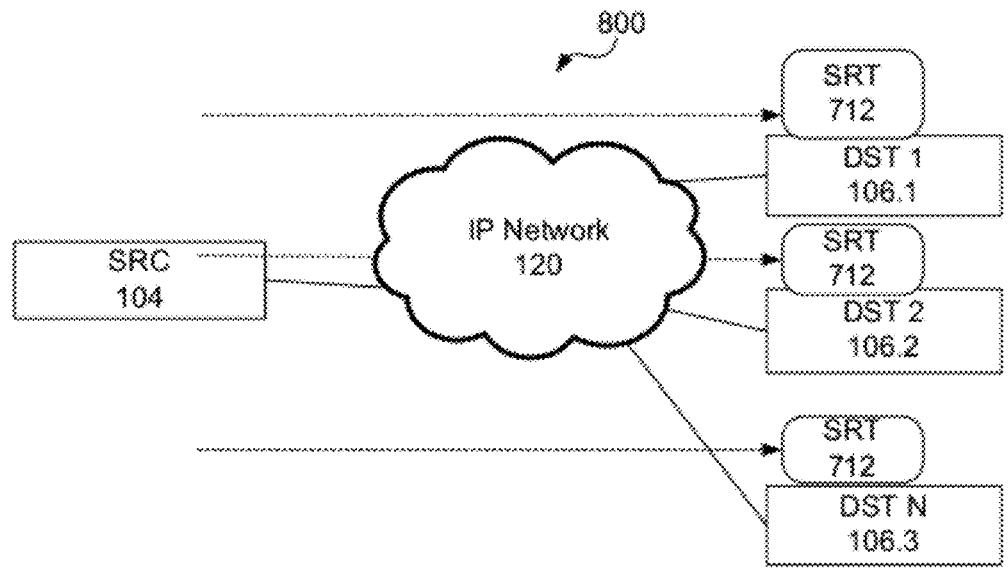
FIGS. 8A and 8B illustrates source rate tracking methods in accordance with one embodiment.
Figure 8B:
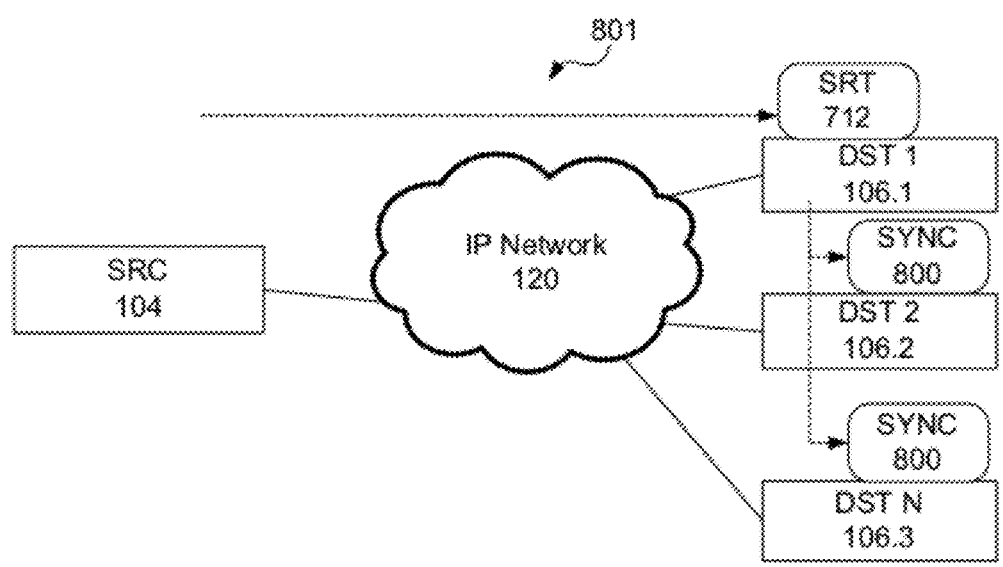

When streaming from a source 104 to multiple destinations 106 over an IP network 120, the mechanism for tracking the sample/frame rate at each destination 106 can be implemented in a number of ways, including those represented schematically in FIGS. 8A and 8B.

As shown in FIG. 8A, in the preferred embodiment 800, each destination 106 implements its own source rate tracking 712 independent of the other destinations 106.

In an alternative embodiment 801 shown in FIG. 8B, only one destination 106.1 implements source rate tracking 712, ensuring its sampling rate matches that of the source 104. The other destinations 106.2 and 106.3 have a synchronization mechanism 800 to synchronize their clocks rates with this first destination 106.1. The net effect of both embodiments 800 and 800' is the same in that they both result in all of the destinations 106 tracking the sample rate of the media source device 104. However in the alternative embodiment of FIG. 8B, only the first destination 106.1 performs source rate tracking 712.

The synchronization mechanism used to synchronize the clocks on each destination can be any of a variety of mechanisms, including a mechanism described in U.S. patent application Ser. No. 11/627,957 which is incorporated herein by reference.

these s,,Multirole

The wireless speaker, in addition to being a media renderer is also capable of being a media server and controller. Media based on the speaker can be served to itself as a renderer and other speakers in its zone for rendering on each speaker. Media control can be provided by a speaker in a zone. In one embodiment the speaker acting as the Media controller may provide a web browser interface to a web browser client on another device on the network and thus allow the user to select music to be served and control and configure the rendering speakers. For a speaker acting as a media server, the media may be uploaded through a web browser interface or any other transfer protocol such as FTP that allows the transfer of the media over a network from one device to another. A typical example would be the transfer of digital music from a laptop or mobile PDA device over a Wi-Fi network to the speaker acting as a media server. The media server speakers directory may appear as a directory in a windows work grouped network or a networked domain or as a remote directory for the participating network devices.

Setup

A frequent problem with network devices is how to setup IP address and Wi-Fi configuration on these devices with the least amount of user interaction or difficulty.

In the case of Media destinations that are described in this invention a number of parameters need to be configured. Each media destination typically has two network adapters, one wireless and one wired. Each adapter needs to be provided with basic network configuration information such as IP address, netmask and Gateway address. These are typically set with an 'ifconfig' command in Linux.

For the Wi-Fi Network adapter a number of additional parameters need to be defined. These are the SSID to connect to, Wi-Fi channel and the Security code, such as the WEP/ WPA/WPA2 code, depending on what is being used for security.

For the wired Ethernet adapter, the network adapter may be configured using the standard DHCP mechanism and this will be the default IP configuration method for the destinations wired adapter. However, in some situations a properly configured DHCP server may not be on the network. Therefore it is necessary to have some other mechanism by which to set the network information for the network adapter.

The Wi-Fi network adapter may also have its network configuration set via DHCP, however before this can happen the adapter needs to be notified what SSID and WEP code to use.

Therefore this invention describes a method as follows.

Each destination device has a wired Ethernet network adapter and a wireless Wi-Fi network adapter. A source computer that is used to configure the destination devices also has a Wi-Fi adapter and an Ethernet adapter. In addition there is a local Wi-Fi access point that is turned on and the source computer is connected to its Wi-Fi network. The source computer is also connected to a wired Ethernet network if it is normally used.

1) Each destination device to be configured is first connected to the source computer via a wired IP (Ethernet network). This may be done by wiring the destination device and source computer to a network switch/hub, connecting the destination and source computer ports together with a 'twisted' Ethernet cable, or connecting the destination and source computer together with a normal Ethernet cable—if either the destination device or source computer Ethernet devices are Auto MDX capable.

2) Once this is done, the destination device is powered up and a configuration and setup application will be run on the source computer.

3) This application will first gather a list of network adapters on the source computer. The application will then present the user with this list of network adapters and ask the user to select a wired adapter to be used for initial setup of the network devices and a wired or wireless adapter for subsequent media transport operation. For each adapter selected the application will obtain detailed network configuration information from the adapter. For wired adapters this includes the IP address, netmask and Gateway. For a wireless adapter, it will get this info plus the SSID and WEP/WPA/WPA2 code for the Wi-Fi network the adapter is connected to.

Ethernet Network Adapter
DEVICE=ixp0
BOOTPROTO=dhcp/none
IPADDR=192.168.1.33
NETMASK=255.255.255.0
GATEWAY=192.168.1.10
WiFi Network Adapter
DEVICE=ath0
BOOTPROTO=dhcp/none
IPADDR=192.168.20.33
NETMASK=255.255.255.0
GATEWAY=192.168.20.10
KEY=s:blackfirecorp
CHANNEL=11
ESSID=EDTP1
Role
ROLE=

4) This application will then broadcast or multicast a message to a known multicast address on the Ethernet network requesting the destination network configuration information.

5) The destination device after power up will be listening for messages on this known multicast address. Even if the destination device is on a different network by default from the network address of the source computer, it will receive the multicast address, because it is sent to a known multicast address.

6) On receipt of the multicast message requesting destination network configuration information, the destination device will respond with a message, to a globally known multicast response address with information about its initial network configuration. This will includes its initial IP address, netmask, gateway address for each network adapter as well as the SSID and WEP/WPA codes for the Wi-Fi adapter. This information will also include a MAC address. Since every MAC address is globally unique, the MAC address can be used to uniquely identify each Destination device.

7) The source computer will be listening for a response from any devices on the network at the globally known multicast response address, and will receive any response sent by each destination device.

8) On receipt of the network configuration information from one or more destination devices connected to the source computer wired network, the source computer will use this information, plus the information gathered from its local network adapters to build a "set network adapter configuration" message to each destination. The set network adapter configuration message may include the IP address, netmask and gateway for each network adapter in the destination device. In addition, for the Wi-Fi adapter on the destination device, the configuration message will include the SSID to connect to and the WEP/WPA code to use.

What values to use for these will be based on the network configuration information currently being used by the local adapters on the source computer. For example, the SSID and WEP/WPA code it will send in the set network configuration message to each destination will be the same information from the Wi-Fi adapter on the source computer.

In addition the source application may present information to the user and obtain user input on what values to use.

The source computer will send the set network adapter message to the target destination device by multicasting it together with information on the destination devices initial IP address and MAC address.

9) The destination device will use the initial IP address and MAC address in the set network adapter message to confirm that it is the valid target of the set network adapter message. If it is the valid target, it will use the information in the set network adapter message to configure its network adapters. The new configuration will not take effect until the destination device is rebooted. Prior to doing so, the source computer may send another message requesting destination network configuration, to confirm that the network adapter information for the destination device is correct.

10) After rebooting, the source application will check that the destination responds at the new address.

11) If the destination does not respond at the new address, the process above will be repeated.

3. Automobile Applications

The media system shown in FIG. 8 is also applicable inside an automobile.

Figure 9:
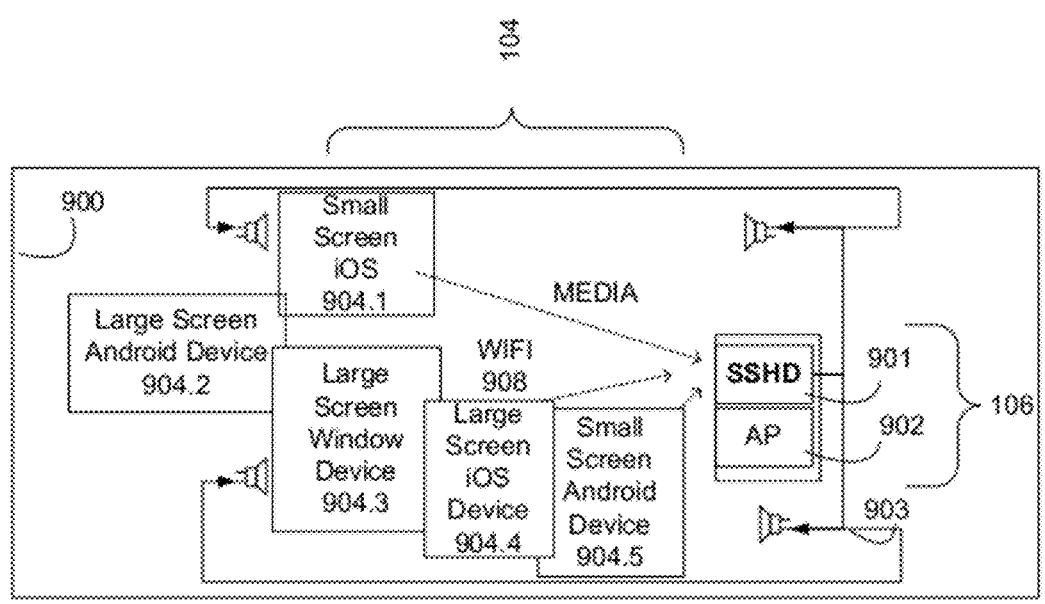
FIG. 9 illustrates an automobile media system in accordance with one embodiment.

The inside cabin of the car 900 contains a typical car audio system 903 with a number of speakers around the cabin. This in-cabin audio system is IP enabled to receive media via a device 901. This together with the in-cabin audio system, creates a destination device 106 as referred to in FIG. 2. The system also includes an Access Point AP 902. The diagram shows a variety of source devices 904.X. These include any of a variety of computing devices including notebooks, smartphones and other handheld devices. FIG. 9 shows a small screen iOS operating system device such as an Apple iPhone (Trademark Apple Inc.), a small screen Android (Trademark Google Inc) device such as a Motorola Droid (Trademark Motorola Inc), and large screen iOS device such as an Apple iPad, a large screen Android device such as a Samsung Galaxy (Trademark Samsung Electronics Inc.) Tab and a large screen Windows device such as a Microsoft Windows 7 based notebook.

In this invention users (passengers and the driver) are able to stream media, using an in-cabin Wi-Fi network 908, created by the in-cabin access point 902 from multiple media sources 904 to a destination audio device 106 that is the car audio system without docking the source devices 904 or wiring or using adapters on the source devices 904.

Each media source 904 is able to wirelessly discover the car audio system, (destination device 106), using the discovery methods described previously. Media playback can transition from one source device 904 to the other using the discovery mechanism described previously.

As an example, two teenagers in the back seat of the car may alternately play music to the car audio system 903 from their respective smartphones 904, without wiring or docking the phones.

The in car system 903 may also include video rendering devices, such as LCD or LED flat screens. In this case, the passengers may stream video to the in car flat screens in addition to streaming audio. As an example, a teenager would be able to play the movie she is watching on her smart phone 904 to one or more video screens and the audio system 903 in the car.

in-s-in-options in-sources controlled features In the present invention, messages which are specified as being otherwise transmitted may be unicast, multicast or broadcast; asynchronous transmissions may not be used for portions or all of the process; destination locations may be determined on criteria other than lifestyle; there may be only one source device or only one destination device; the discovery process may include more or fewer stages and/or transmissions; there may be more or few asynchronous transmissions in the various stages of the discovery process; destination devices may be selected based on criteria other than those described; other priority criteria for selecting media from source devices may be used; the synchronization channel may utilize other means of transmission and/or other protocols; the beacon period may be greater than or less than that described; beacon messages may include other information; beacon messages may not include slot position information; other user interface features may be included; source-rate tracking may be otherwise implemented; the media may be a type of media other than audio or video; other types of control messages may be involved or utilized; etc.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A system for mobile source device playback of media over spatially-separated destination devices, comprising:
   a communication network;
   a first media rendering destination device at a first lifestyle-determined location having a first local clock and having first means for communication with the communication network;
   a second media rendering destination device at a second lifestyle-determined location a second local clock and having second means for communication with the communication network, the first lifestyle-determined location being spatially separated from the second lifestyle-determined location; and
   a mobile source device having media storage, means for multicasting and unicasting over the communication network, and destination transition means, the destination transition means implementing a discovery process comprising the steps of:
      detecting proximity of destination devices;
      sending the media in the media storage from the mobile source device to a proximate destination device; and
      when the mobile source device moves from near the first location to near the second location, transitioning from rendering of the media over the first destination device to rendering of the media over the second destination device;
   wherein the discovery process further comprises at least an exchange of a multicast discovery message from the media source device and a plurality of discovery acknowledge messages from a plurality of discovered potential rendering destination devices, the plurality discovery acknowledge messages being sent in response to the discover message from the media source device;
   wherein synchronization of the first local clock and the second local clock is implemented using a separate synchronization channel;
   wherein the separate synchronization channel is a separate communication mechanism that is not interfaced to the communication network; and
   wherein synchronization of the first local clock and the second local clock is performed by the first media rendering destination device sending, on the separate synchronization channel, a beacon message comprising a clock value of the first local clock to the second media rendering destination device, and the second media rendering destination device thereupon synchronizing the second local clock to the first local clock based at least on the clock value.

2. The system of claim 1 wherein the first media rendering destination device renders media over a first real-world environment, and the second media rendering destination device renders media over a second real-world environment separate from the first real-world environment.

3. The system of claim 2 further including a third media rendering destination device at a third lifestyle-determined location and having third means for communication with the communication network, the third lifestyle-determined location being spatially separated from the first and the second lifestyle-determined locations, and the third media rendering destination device rendering media over the first real-world environment.

4. The system of claim 3 wherein the first media rendering destination device renders a first stereo channel of a stereo pair and the third media rendering destination device renders a second stereo channel of the stereo pair.

5. The system of claim 1 wherein said communication network is a wireless Internet Protocol network.

6. The system of claim 1 wherein the first destination device is assigned a higher priority level and the second destination device is assigned a lower priority level and the mobile source device includes a means for choosing a higher priority level for rendering so the media is rendered by the first destination device rather than the second destination device.

7. The system of claim 1 wherein the discovery process involves asynchronous multicasting to a global address.

8. The system of claim 7 wherein the multicasting utilizes a low-overhead communication protocol.

9. The system of claim 8 wherein the low-overhead communication protocol is User Datagram Protocol.

* * * * *